United States Patent
Abuolaim et al.

(10) Patent No.: US 12,412,315 B2
(45) Date of Patent: Sep. 9, 2025

(54) SYSTEM AND METHOD OF DUAL-PIXEL IMAGE SYNTHESIS AND IMAGE BACKGROUND MANIPULATION

(71) Applicants: Abdullah Abuolaim, North York (CA); Mahmoud Afifi, North York (CA); Michael Brown, Toronto (CA)

(72) Inventors: Abdullah Abuolaim, North York (CA); Mahmoud Afifi, North York (CA); Michael Brown, Toronto (CA)

( * ) Notice: Subject to any disclaimer, the term of this patent is extended or adjusted under 35 U.S.C. 154(b) by 322 days.

(21) Appl. No.: 17/816,787

(22) Filed: Aug. 2, 2022

(65) Prior Publication Data

US 2023/0056657 A1 Feb. 23, 2023

Related U.S. Application Data

(60) Provisional application No. 63/228,729, filed on Aug. 3, 2021.

(51) Int. Cl.
| | |
|---|---|
| *G06T 9/00* | (2006.01) |
| *G06T 7/536* | (2017.01) |
| *G06T 7/571* | (2017.01) |
| *G06T 7/194* | (2017.01) |

(52) U.S. Cl.
CPC .............. *G06T 9/004* (2013.01); *G06T 7/536* (2017.01); *G06T 7/571* (2017.01); *G06T 7/194* (2017.01)

(58) Field of Classification Search
CPC ......... G06T 9/004; G06T 7/536; G06T 7/571; G06T 7/194; G06T 5/60; G06T 5/73; G06T 2207/20081; G06T 2207/20084
See application file for complete search history.

(56) References Cited

U.S. PATENT DOCUMENTS

| | | | | |
|---|---|---|---|---|
| 9,350,977 | B1 * | 5/2016 | Prasad | H04N 13/204 |
| 11,107,228 | B1 * | 8/2021 | Shrivastava | G06T 11/00 |
| 2021/0312242 | A1 * | 10/2021 | Jafarkhani | G06F 18/2148 |
| 2022/0375042 | A1 * | 11/2022 | Garg | G06T 7/55 |

FOREIGN PATENT DOCUMENTS

CN 112792821 A * 5/2021

OTHER PUBLICATIONS

Pan et al Dual Pixel Exploration: Simultaneous Depth Estimation and Image Restoration, arXiv:201.00301v1 (Year: 2020).*
Punnappurath et al Reflection Removal Using a Dual-Pixel Sensor, CVPR, pp. 1556-1565 (Year: 2019).*
Abuolaim et al Defocus Deblurring Using Dual-Pixel Data, arXiv:2005.00305v3 Jun. 16, 2020.*

* cited by examiner

*Primary Examiner* — Xiao Liu
(74) *Attorney, Agent, or Firm* — Bhole IP Law; Anil Bhole; Marc Lampert

(57) ABSTRACT

A system and method of determining synthetic dual-pixel data, performing deblurring, predicting dual pixel views, and view synthesis. The method including: receiving an input image; determining synthetic dual-pixel data using a trained artificial neural network with the input image as input to the trained artificial neural network, the trained artificial neural network includes a latent space encoder, a left dual-pixel view decoder, and a right dual-pixel view decoder; and outputting the synthetic dual-pixel data. In some cases, determination of the synthetic dual-pixel data can include performing reflection removal, defocus deblurring, or view synthesis.

18 Claims, 23 Drawing Sheets

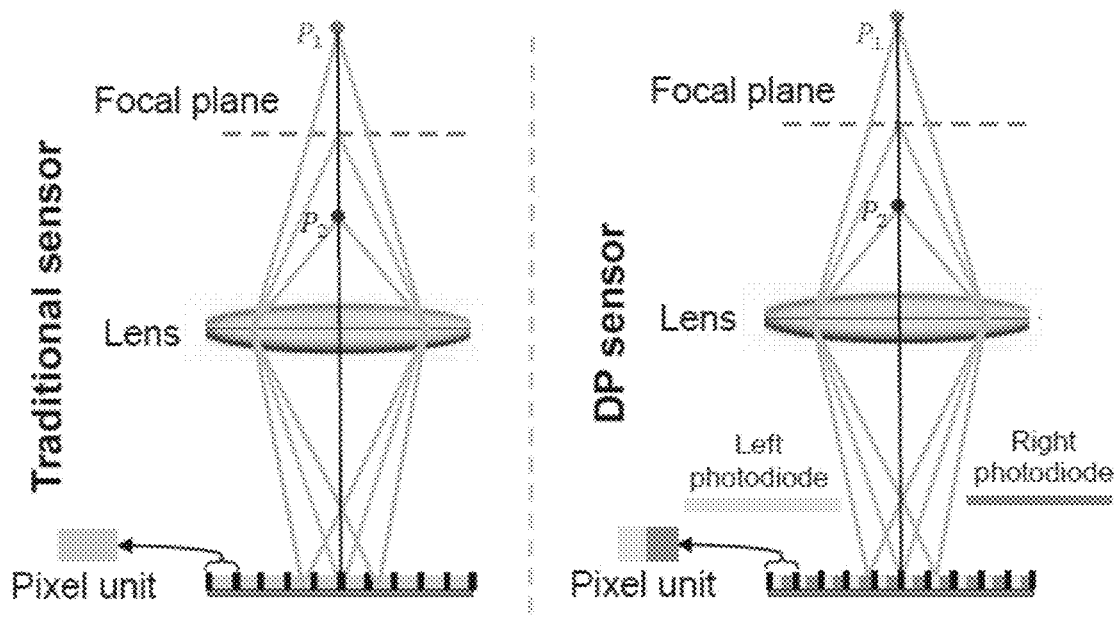
FIG. 5A
FIG. 5B
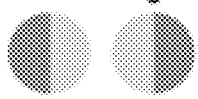
FIG. 5C
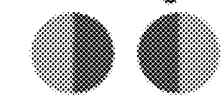
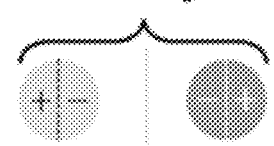
FIG. 5D

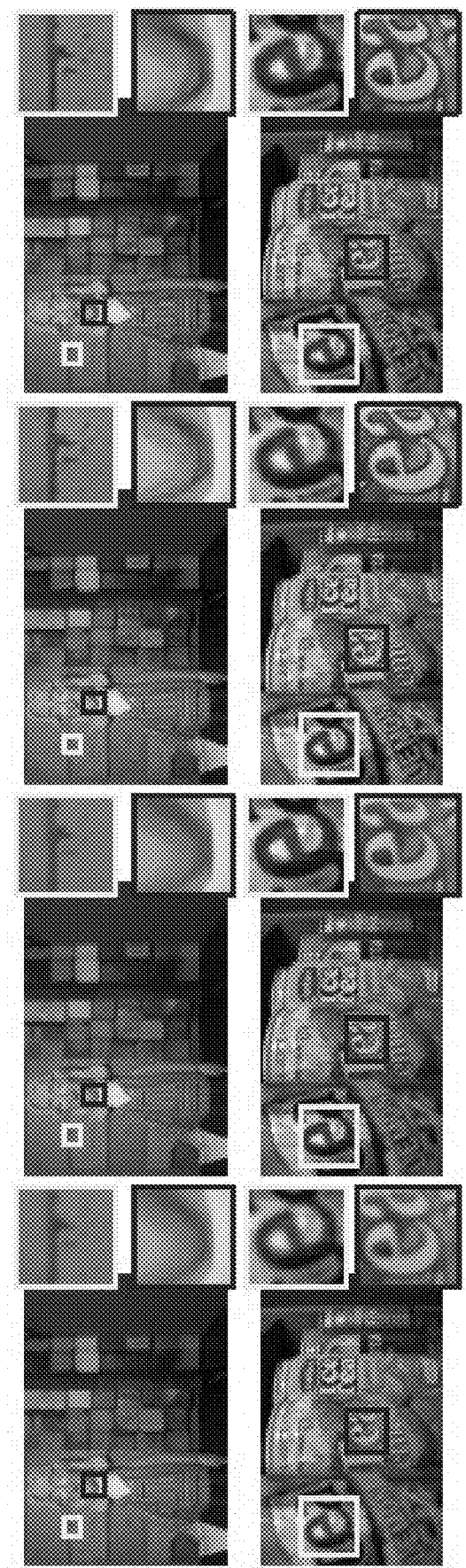

SYSTEM AND METHOD OF DUAL-PIXEL IMAGE SYNTHESIS AND IMAGE BACKGROUND MANIPULATION

TECHNICAL FIELD

The present disclosure relates generally to image capture and processing. More particularly, the present disclosure relates to a system and method of dual-pixel image synthesis and image background manipulation.

BACKGROUND

Defocus blur occurs to scene points in captured images that are captured outside a camera's depth of field (DoF). Reducing defocus blur is challenging due to the nature of the spatially varying point spread functions (PSFs) that vary with scene depth. Various approaches for DoF blur reduction approach the problem in two stages: (1) estimate a defocus map of the input and (2) apply off-the-shelf non-blind deconvolution guided by the estimated defocus map. The performance of these approaches are generally bounded by the DoF map estimation and the limited effectiveness of the non-blind deconvolution. Additionally, due to the two-stage approach, these approaches have a long processing time.

SUMMARY

In an aspect, there is provided a method of determining synthetic dual-pixel data, the method comprising: receiving an input image; determining synthetic dual-pixel data using a trained artificial neural network with the input image as input to the trained artificial neural network, the trained artificial neural network comprises a latent space encoder, a left dual-pixel view decoder, and a right dual-pixel view decoder; and outputting the synthetic dual-pixel data.

In a particular case of the method, the artificial neural network is trained by inputting a training dataset of images and optimizing for a dual-pixel-loss function and a view difference loss function.

In another case of the method, the training dataset of images comprises a plurality of scenes, each comprising both dual pixel images capturing the scene.

In yet another case of the method, the left dual-pixel view decoder and the right dual-pixel view decoder comprise an early-stage weight sharing at the end of the latent space encoder In yet another case of the method, the method further comprising performing deblurring of the input image and outputting a deblurred image, wherein the trained artificial neural network further comprises a deblurring decoder, and wherein the deblurred image comprises the output of the deblurring decoder.

In yet another case of the method, the method further comprising predicting dual pixel views of the input image by outputting the output of the left dual-pixel view decoder and the right dual-pixel view decoder.

In yet another case of the method, the method further comprising performing reflection removal, defocus deblurring, or both, using the predicted dual pixel views.

In yet another case of the method, the method further comprising performing view synthesis using the input image, wherein determining the synthetic dual-pixel data comprises passing each of a plurality of rotated views of the input image as input to the trained artificial neural network, and wherein the view synthesis comprises a combination of the output of the left dual-pixel view decoder and the output of the right dual-pixel view decoder for each of the rotated view of the input image.

In yet another case of the method, the artificial neural network is trained with a loss function comprising a dual-pixel-loss, a view difference loss, and a mean-square-error loss between ground truth and estimated dual-pixel views.

In yet another case of the method, the method further comprising synthesizing image motion by rotating point spread functions through a plurality of different angles during the view synthesis.

In another aspect, there is provided a system for determining synthetic dual-pixel data, the system comprising a processing unit and data storage, the data storage comprising instructions for the processing unit to execute: an input module to receive an input image; a neural network module to determine synthetic dual-pixel data using a trained artificial neural network with the input image as input to the trained artificial neural network, the trained artificial neural network comprises a latent space encoder, a left dual-pixel view decoder, and a right dual-pixel view decoder; and an output module to output the synthetic dual-pixel data.

In a particular case of the system, the artificial neural network is trained by inputting a training dataset of images and optimizing for a dual-pixel-loss function and a view difference loss function.

In another case of the system, the training dataset of images comprises a plurality of scenes, each comprising both dual pixel images capturing the scene.

In yet another case of the system, the left dual-pixel view decoder and the right dual-pixel view decoder comprise an early-stage weight sharing at the end of the latent space encoder In yet another case of the system, the neural network module further performs deblurring of the input image and the output module outputs the deblurred image, wherein the trained artificial neural network further comprises a deblurring decoder, and wherein the deblurred image comprises the output of the deblurring decoder.

In yet another case of the system, the neural network module further predicts dual pixel views of the input image by determining the output of the left dual-pixel view decoder and the right dual-pixel view decoder.

In yet another case of the system, reflection removal, defocus deblurring, or both, are performed using the predicted dual pixel views.

In yet another case of the system, the processing unit further executing a synthesis module to perform view synthesis using the input image, wherein determining the synthetic dual-pixel data comprises passing each of a plurality of rotated views of the input image as input to the trained artificial neural network, and wherein the view synthesis comprises a combination of the output of the left dual-pixel view decoder and the output of the right dual-pixel view decoder for each of the rotated view of the input image.

In yet another case of the system, the artificial neural network is trained with a loss function comprising a dual-pixel-loss, a view difference loss, and a mean-square-error loss between ground truth and estimated dual-pixel views.

In yet another case of the system, the synthesis module further synthesizes image motion by rotating point spread functions through a plurality of different angles during the view synthesis.

These and other aspects are contemplated and described herein. It will be appreciated that the foregoing summary sets out representative aspects of systems and methods to assist skilled readers in understanding the following detailed description.

BRIEF DESCRIPTION OF THE DRAWINGS

The features of the invention will become more apparent in the following detailed description in which reference is made to the appended drawings wherein:

FIG. 5A is a diagram of a dual-pixel (DP) sensor image formation of a traditional sensor versus a DP sensor;

FIG. 5B is diagram of a circle of confusion (CoC) formation for a traditional sensor;

FIG. 5C is diagram of a circle of confusion (CoC) formation for a DP sensor;

FIG. 5D is diagram showing subtracted DP views in the front/back focus cases, where the +/− sign reveals the front/back focus ambiguity;

FIG. 9A shows input images, FIG. 9B shows outputs of a single-image defocus deblurring method EBDB, FIG. 9C shows outputs of a single-image defocus deblurring method DMENet, FIG. 9D shows outputs of a single-image defocus deblurring method DPDNet (single), FIG. 9E shows outputs of the system of FIG. 1, and FIG. 9F shows ground truth images;

FIG. 12A shows input images, FIG. 12B shows outputs of the single-image defocus deblurring method EBDB, FIG. 12C shows outputs of the single-image defocus deblurring method DMENet, FIG. 12D shows outputs of the single-image defocus deblurring method DPDNet (single), FIG. 12E shows outputs of the system of FIG. 1, and FIG. 12F shows ground truth images;

FIGS. 13A to 13D show an example of a qualitative comparison with single-image defocus deblurring approaches on various camera devices, where FIG. 13A is the input image, FIG. 13B is the single-image defocus deblurring approach of EBDB, FIG. 13C is the single-image defocus deblurring approach of DPDNet (single), and FIG. 13D shows the output of the system of FIG. 1;

FIG. 14A shows an input combined image $I_c$, FIG. 14B shows a still frame from an image motion of eight views generated using a multi-task DP network of the system of FIG. 1, FIG. 14C shows a still frame from animated results of the synthesized DP views, and FIG. 14D shows a still frame from animated ground truth DP views;

FIG. 15A shows an input combined image $I_c$, FIG. 15B shows a still frame from an image motion of eight views generated using the MDP of the system of FIG. 1, FIG. 15C shows a still frame from animated results of the synthesized DP views synthesized by the system of FIG. 1, and FIG. 15D shows a still frame from animated ground truth DP views;

FIG. 16A shows an input combined image $I_c$, FIG. 16B shows a still frame from an image motion of eight views generated using the MDP of the system of FIG. 1, FIG. 16C shows a still frame from animated results of the synthesized DP views synthesized by the system of FIG. 1, and FIG. 16D shows a still frame from animated ground truth DP views;

FIG. 17A shows an input combined image $I_c$, FIG. 17B shows a still frame from an image motion of eight views generated using the MDP of the system of FIG. 1, FIG. 17C shows a still frame from animated results of the synthesized DP views synthesized by the system of FIG. 1, and FIG. 17D shows a still frame from animated ground truth DP views;

FIG. 22A shows an all-in-focus input image and FIG. 22B shows an image with the synthetic Bokeh applied; FIG. 23A shows an all-in-focus input image and FIG. 23B shows an image with the synthetic Bokeh applied.

DETAILED DESCRIPTION

Figure 1:
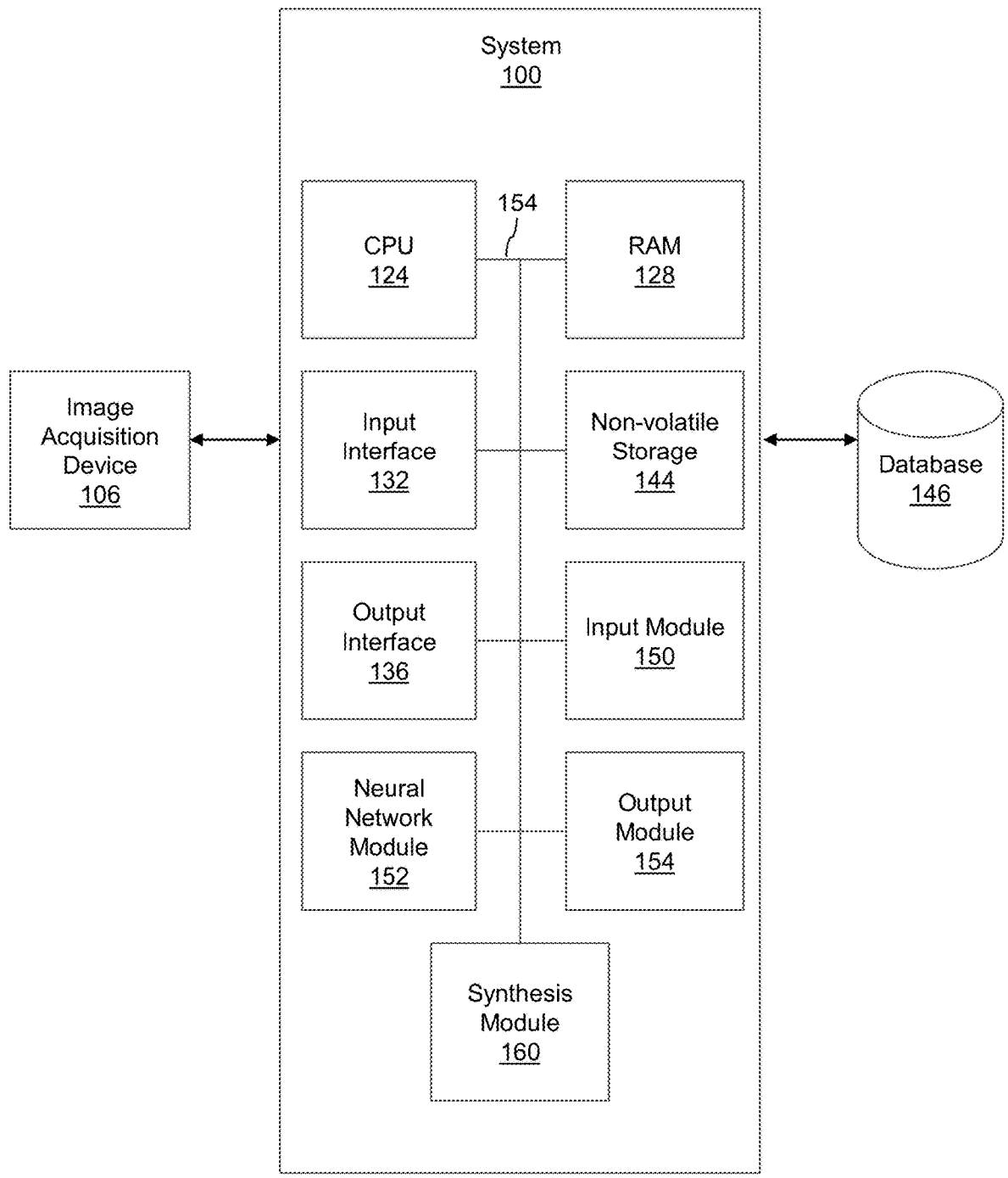
FIG. 1 is a block diagram of a system of dual-pixel image synthesis and image background manipulation, in accordance with an embodiment.

Embodiments will now be described with reference to the figures. For simplicity and clarity of illustration, where considered appropriate, reference numerals may be repeated among the Figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description.

Any module, unit, component, server, computer, terminal, engine or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the device or accessible or connectable thereto. Further, unless the context clearly indicates otherwise, any processor or controller set out herein may be implemented as a singular processor or as a plurality of processors. The plurality of processors may be arrayed or distributed, and any processing function referred to herein may be carried out by one or by a plurality of processors, even though a single processor may be exemplified. Any method, application or module herein described may be implemented using computer readable/executable instructions that may be stored or otherwise held by such computer readable media and executed by the one or more processors.

The following relates generally to image capture and processing. More particularly, the present disclosure relates to a system and method of dual-pixel image synthesis and image background manipulation.

A dual-pixel (DP) sensor uses two photodiodes at each pixel location with a microlens placed on the top of each pixel site, as shown in the diagram of FIG. 5A. DP sensors were originally developed to improve camera autofocus by functioning as a simple two-sample light field camera. The two-sample light-field provides two sup-aperture views of the scene and, depending on the sensor's orientation, the views can be referred as left/right or top/down pairs; such as left and right pair $I_l$ and $I_r$. The light rays coming from scene points that are within the camera's DoF exhibit little to no difference in phase between the views. On the other hand, light rays coming from scene points outside the camera's DoF exhibit a noticeable defocus disparity in the left-right views. The amount of defocus disparity is correlated to the amount of defocus blur.

Unlike with a traditional stereo sensor illustrated in FIG. 5B, the difference between the DP views can be modeled as a latent sharp image being blurred in two different directions using a half-circle point spread function (PSF). This is illustrated in the resultant circle of confusion (CoC) of FIG. 5C. On real DP sensors, the ideal case of a half-circle CoC is only an approximation due to constraints of the sensor's construction and lens array. These constraints allow a part of the light ray bundle to leak into the other-half dual pixels (see half CoC of left/right views in FIG. 5C). DP image formation is as follows: Let $I_s$ be a latent sharp image patch and $H_l$ and $H_r$ are the left/right PSFs; then the DP $I_l$ and $I_r$ can be represented as:

$$I_l = I_s * H_l, I_r = I_s * H_r,\qquad(1)$$

$$H_r = H_l^f,\qquad(2)$$

where * denotes the convolution operation and $H_l^f$ is the flipped $H_l$. The two views $I_l$ and $I_r$ are combined to produce the final image provided by the camera $I_c$ as follows:

$$I_c = I_l + I_r\qquad(3)$$

Another interesting property of the DP PSFs is that the orientation of the "half CoC" of each left/right view reveals if the scene point is in front or back of the focal plane, as shown in the subtracted views of the two scene points, $P_1$ and $P_2$ in FIG. 5D.

Depth of field (DoF) deblurring can leverage the availability of dual-pixel (DP) camera sensor data to deblur images. In some approaches, a trained deep neural network (DNN) can use the DP sensor's two sub-aperture views as input to predict a single deblurred image. The effectiveness of this approach is attributed to the DNN's ability to learn the amount of spatially varying defocus blur from the two DP views. This idea stems from the way the DP sensors work. DP sensors were originally developed as a means to improve the camera's autofocus system. The DP design produces two sup-aperture views of the scene that exhibit differences in phase that are correlated to the amount of defocus blur. A camera adjusts the lens position to minimize phase differences in the two DP views, resulting in a final in-focus image.

A notable drawback of using DP data is that most commercial cameras do not provide access to the data from the DP sensor's two sub-aperture views. Even where commercial cameras provide DP sensor data, there are typically significant caveats for accessing this data; for example, requiring special software to extract the two views, requiring a special binary, or only outputting the DP data for one color channel of the RAW image. These limitations make the use of DP data at inference time impractical.

In order to perform defocus deblurring, training data is required in the form of paired images; one sharp and one blurred. In an example, training images can be obtained by placing a camera on a tripod and capturing an image using a wide aperture (i.e., blurred image with shallow DoF), followed by a second image captured using a narrow aperture (i.e., target sharp image with large DoF). Care must typically be taken to ensure that the camera is not moved between aperture adjustments and that the scene content remains stationary. Such data acquisition is a time-consuming process and does not facilitate collecting larger datasets.

The present embodiments advantageously solve at least the aforementioned challenges for accessing DP data at inference time and the challenges in capturing blurry and sharp paired data for training. Particularly advantageous, embodiments of the present disclosure use single-image input at inference time by incorporating joint training of predicting DP views. The training of the DP-view reconstruction task requires only the capture of DP images in an unrestricted manner without substantial effort. Because DP data is only required at training time, inference time becomes substantially more practical to implement.

Embodiments of the present disclosure use a multi-task DNN framework to jointly learn single-image defocus deblurring and DP-based view prediction/synthesis as they generally use encoding of information regarding the defocus blur present at each pixel in the input image; as illustrated in FIGS. 6A to 6F. As such, the present embodiments provide a single-encoder multi-decoder DNN that can take a single input image and decomposes it into DP left and right views along with a deblurred version. In the present inventors' example experiments, training a DNN to both deblur an input image and predict two sub-aperture DP views improved deblurring result by up to +1 dB peak signal-to-noise ratio (PSNR) over other approaches. In the example experiments, a dataset was captured with varying DoF blur consisting of 2,353 high-quality full-frame images using a DP camera. This give a total of 7,059 images; 2,353 conventional images and their corresponding two sub-aperture DP views. Specific loss functions were generated based on DP image formation to help the network avoid ambiguity that arises in DP data. The example experiments showed the results significantly outperformed other single-image DoF deblurring techniques, both quantitatively and qualitatively. The techniques of the present embodiments can be used for, at least, defocus deblurring, producing DP views, reflection removal, and multi-view synthesis.

Figure 7:
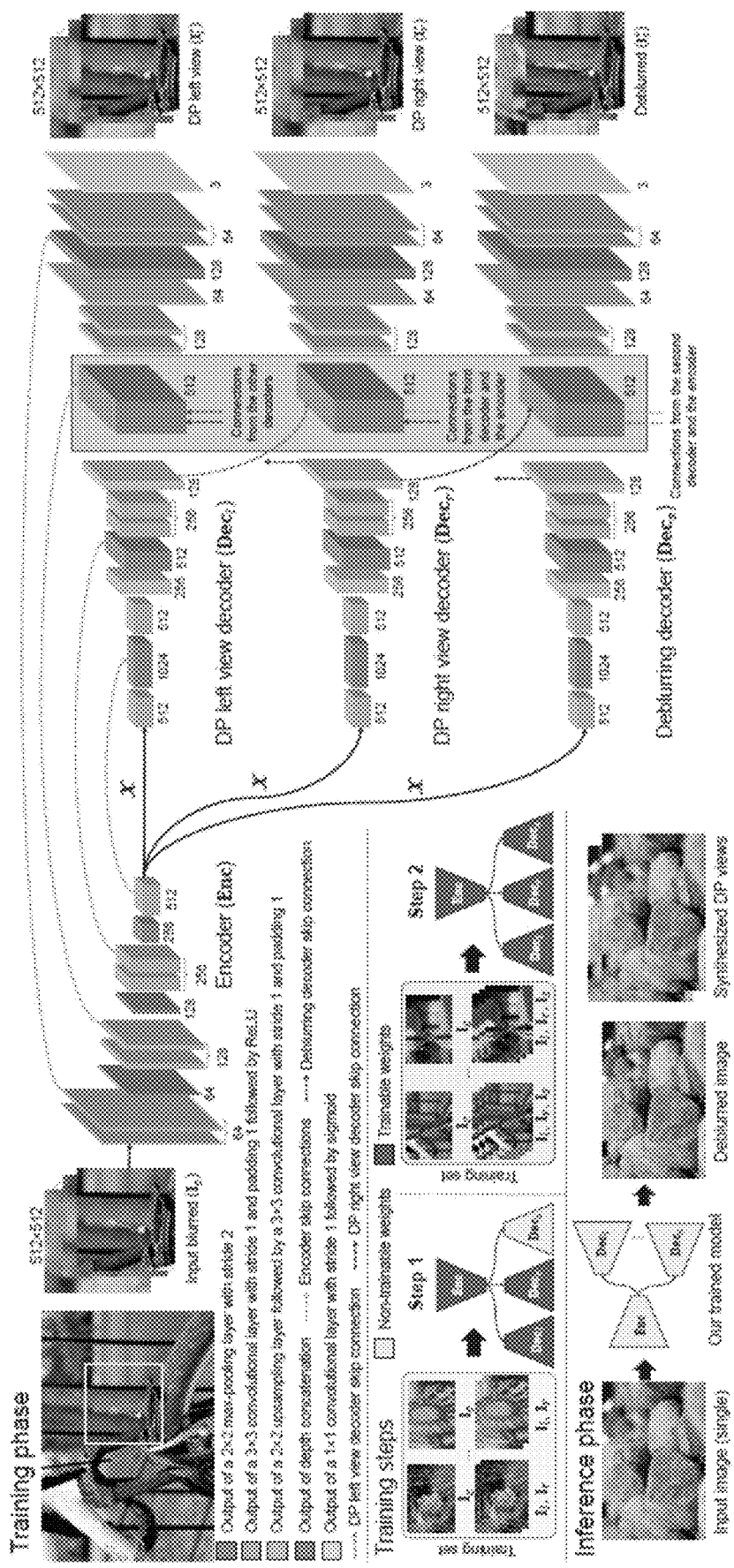
FIG. 7 illustrates a diagrammatic overview of an example approach of a multi-task learning framework, in accordance with the system of FIG. 1.

FIG. 7 illustrates a diagrammatic overview of an example approach of a multi-task learning framework. As described herein, a single-encoder multi-decoder DNN is used. The multi-task DP network takes a single input image ($I_c$) and outputs three images: left ($I_l$) and right ($I_r$) DP views, and a deblurred (sharp) version ($I_s$). The network can have two stages of weight sharing between three decoders (i.e., $Dec_l$, $Dec_r$, and $Dec_s$): early at the encoder ($Enc_l$) latent space $\chi$ and middle at the highlighted box. The network can be trained in two steps, where the $Dec_s$ is frozen in the first step and resumed in the next based on the intended task.

Turning to FIG. 1, shown therein is a diagram for a system of dual-pixel image synthesis and image background manipulation 100, in accordance with an embodiment. The system 100 can include a number of physical and logical components, including a central processing unit ("CPU") 124, random access memory ("RAM") 128, an input interface 132, an output interface 136, memory comprising non-volatile storage 144, and a local bus 154 enabling CPU 124 to communicate with the other components. CPU 124 can include one or more processors. RAM 128 provides relatively responsive volatile storage to CPU 124. The input interface 132 enables a user to provide input via, for example, a touchscreen. The output interface 136 outputs information to output devices, for example, to the touchscreen. Non-volatile storage 144 can store computer-executable instructions for implementing the system 100, as well as any derivative or other data. In some cases, this data can be stored or synced with a database 146, that can be local to the system 100 or remotely located (for example, a centralized server or cloud repository). During operation of the system 100, data may be retrieved from the non-volatile storage 144 and placed in RAM 128 to facilitate execution. In an embodiment, the CPU can communicate with the data storage to execute various functional modules; such as, an input module 150, a neural network module 152, an output module 154, and a synthesis module 160. In some cases, the functions of the modules can be combined or performed on other modules.

Figure 2:
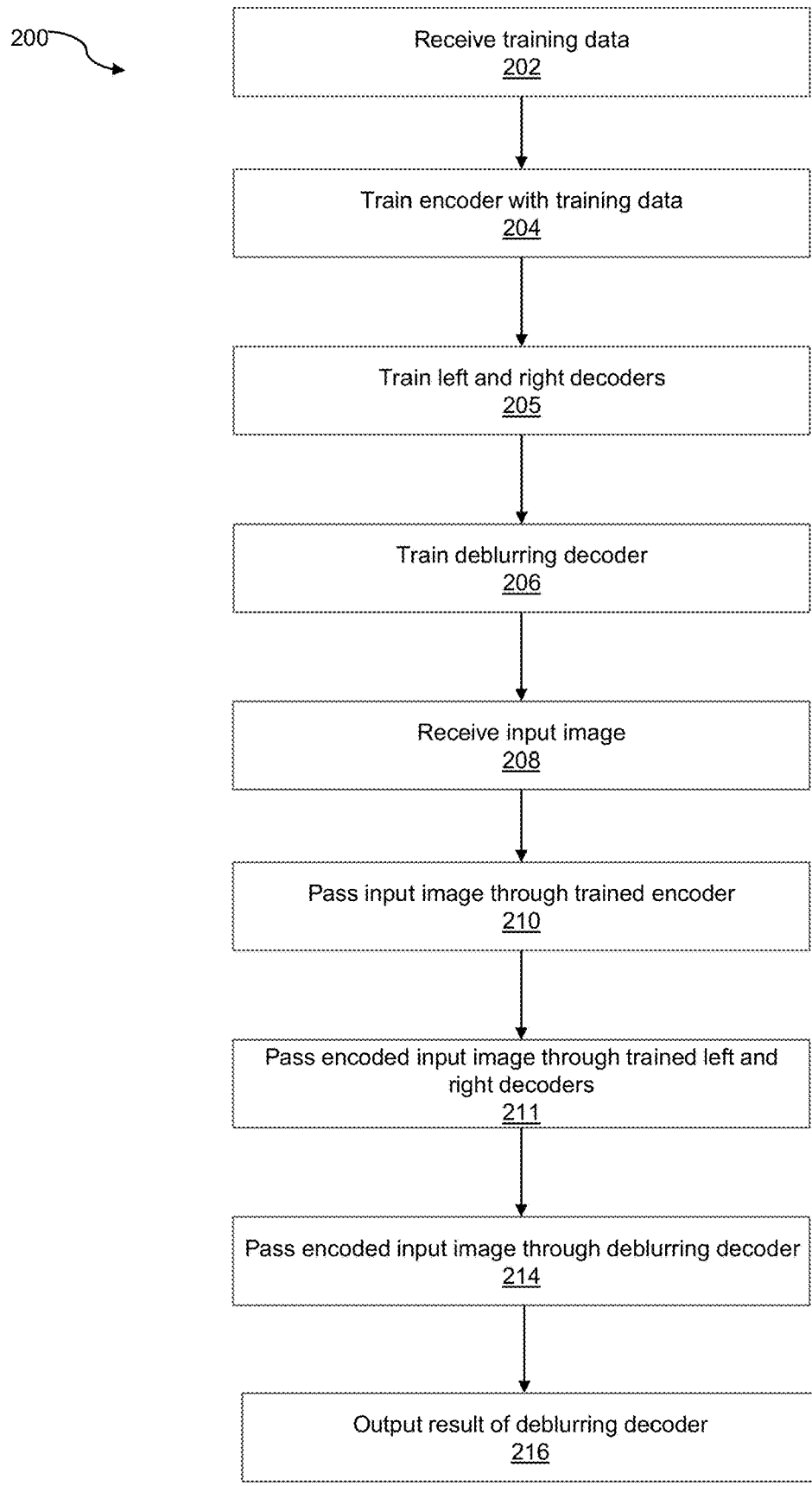
FIG. 2 is a flowchart of a method of deblurring of an image using dual-pixel data, in accordance with an embodiment.

Turning to FIG. 2, shown therein is a flowchart for a method of deblurring of an image using dual-pixel data 200, in accordance with an embodiment.

At block 202, the input module 150 receives training data to train an artificial neural network, as described herein. The input module 150 can receive a dataset of DP scenes for training the neural network. In the example experiments, a DP dataset of 2,353 scenes were received. Each scene consisted of a high-quality combined image (2,353 images) with its corresponding DP views (2,353×2 images). All images were captured at full-frame resolution (i.e., 6720× 4480 pixels). The dataset contained indoor and outdoor scenes with diverse image content, weather conditions, scene illuminations, and day/night scenes. The dataset contained scenes with different aperture sizes (i.e., f/4, f/5.6, f/10, f/16, and f/22) in order to cover a wider range of spatially varying defocus blur (i.e., from all-in-focus to severely blurred images). The DP dataset is used by the neural network module 152 in the multi-task framework, as described herein, for example to optimize directly for the DP-view synthesis task. While the training dataset of the example experiments contained these wide ranges of types of images, it is understood that any suitable sets of training image types can be used.

In some cases, the input module 150 can also receive other datasets for training; for example, the Canon™ DP deblurring dataset (i.e., 350 training paired images) to optimize for both defocus deblurring, DP-view synthesis, and the like.

At blocks 204, 205, and 206, the neural network module 152 uses the training data to train the artificial neural network. In a preferred embodiment, the neural network module 152 uses a symmetric single-encoder multi-decoder deep artificial neural network (DNN) architecture with skip connections between the corresponding feature maps. This DNN model can be referred to as a multi-task dual-pixel (DP) network (MDP). The three decoder branches can have an early-stage weight sharing at the end of the encoder. Middle-stage weight sharing can be added. Each block in the middle-stage weight sharing can receives two skip connections from the corresponding feature maps from the other two decoders. This type of multi-decoder stitching can guarantee weight sharing at multiple stages and provide multiple communication layers that can further assist the multi-task joint training. In most cases, adding late-stage weight sharing is not added as the sharpness of an ultimate deblurred image can be affected by the half point-spread-functions (PSFs) blur present in feature maps of synthesized DP views at later stages. The DNN model of the present embodiments has a sufficiently large receptive field that is able to cover larger spatially varying defocus PSFs. While the present embodiments describe a DNN, it is understood that any suitable artificial neural network can be used; for example, stacking convolutional layers and batch normalization layers without max-pooling layers, such as a denoising convolutional neural network (DnCNN).

At block 204, the neural network module 152 uses the training data to train the encoder (Enc). The encoder (Enc) task in the DNN is to map the input image into a latent space χ as follows:

$$\chi = Enc(I_c). \quad (4)$$

This latent space can be viewed as a defocus estimation space in which both tasks share a common goal that requires a notion of the PSF size at each pixel in the input image. This latent space representation χ is then passed to the three decoders; namely, left and right DP-view decoders ($Dec_l$ and $Dec_r$, respectively), and the defocus deblurring (i.e., sharp image) decoder ($Dec_s$), in order to produce the output estimations as follows:

$$I_l^* = Dec_l(\chi), I_r^* = Dec_r(\chi), I_s^* = Dec_s(\chi) \quad (5)$$

It is instructive to consider how the DP images are formed when designing loss functions to strive to ensure the training process for the two DP views satisfies DP properties. It has been observed empirically that a traditional mean squared error (MSE) loss, computed between the ground truth (GT) and reconstructed DP views, drives the network to a local minima, where the difference between the reconstructed DP views is estimated as an explicit shift in the image content. This observation makes the MSE alone not sufficient to capture the flipping property of DP PSFs (i.e., the PSF reverses direction if it is in front of the focal plane, as exemplified in FIG. 5C). Therefore, the system 100 use a DP-loss based on Equation (3) that imposes a constraint on the DP-view reconstruction process as follows:

$$\mathcal{L}_C = \frac{1}{n}\sum_n (I_c - (I_l^* + I_r^*))^2 \quad (6)$$

where $I_c$ is the input combined image and $I_l^*$ and $I_r^*$ are the estimated DP views.

The calculated $\mathcal{L}_C$ encourages the network to optimize for the fundamental DP image formation (i.e., Equation (3)). While $\mathcal{L}_C$ assists the network to learn that the combined left/right views should sum to the combined image, the front/back focus flipping direction remains generally ambiguous to the network. To address this ambiguity, a new view difference loss $\mathcal{L}_D$ is used to capture the flipping sign direction as follows:

$$\mathcal{L}_D = \frac{1}{n}\sum_n ((I_l - I_r) - (I_l^* - I_r^*))^2 \quad (7)$$

where $I_l$ and $I_r$ are the GT DP left and right views, respectively.

FIG. 5D exemplifies a sign difference in the front/back focus cases when the views are subtracted, which gives a cue for the network to learn the PSF flipping direction when penalizing view difference in the loss, namely $\mathcal{L}_D$.

Figure 8C:
FIGS. 8A to 8F provide a visual analysis of observations that lead to two DP loss functions, namely, $\mathcal{L}_C$ and $\mathcal{L}_D$, in accordance with the system of FIG. 1.
Figure 8F:
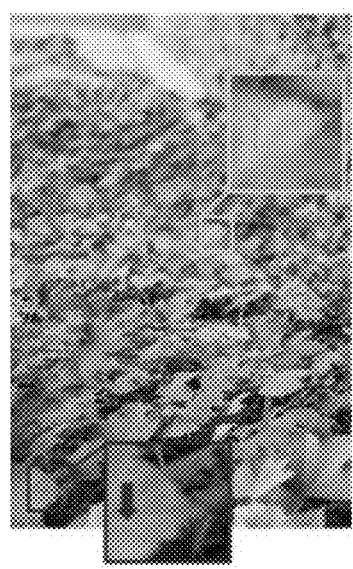
Figure 8B:
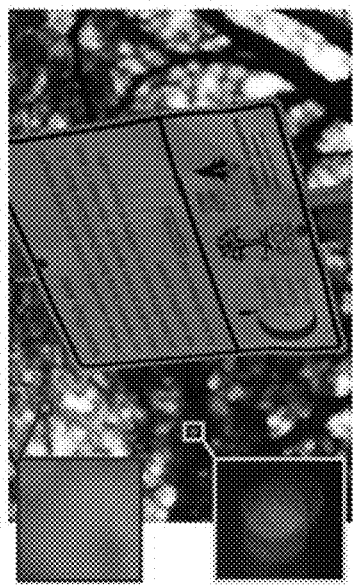
Figure 8E:
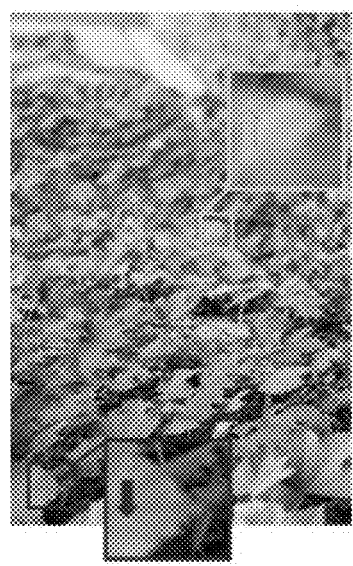
Figure 8A:
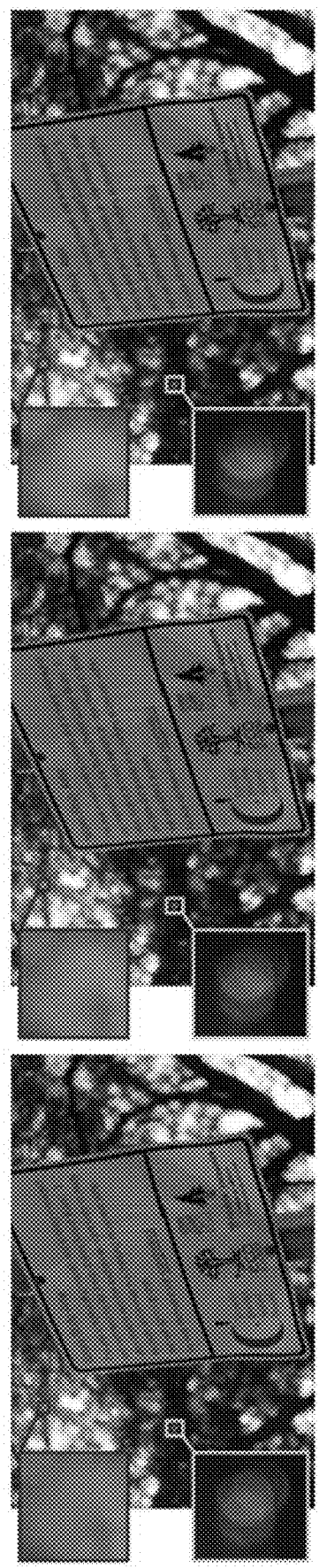
Figure 8D:
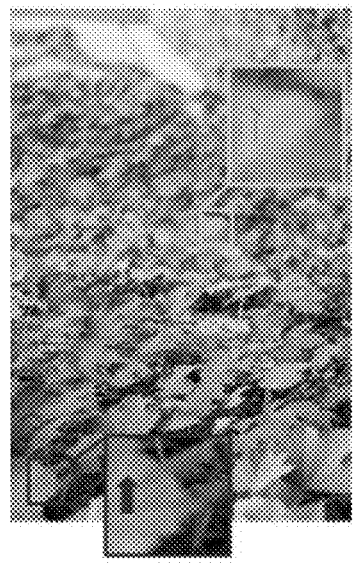

FIGS. 8A to 8F provide a visual analysis of observations that lead to the two DP loss functions, namely, $\mathcal{L}_C$ and $\mathcal{L}_D$. The visual analysis and visual comparison are shown to reflect the effectiveness of the $\mathcal{L}_C$ and $\mathcal{L}_D$ DP-based loss terms. FIG. 8A shows without $\mathcal{L}_C$ loss term, FIG. 8B shows with $\mathcal{L}_C$ loss term, FIG. 8C shows ground truth, FIG. 8D shows without $\mathcal{L}_D$ loss term, FIG. 8E shows with $\mathcal{L}_D$ loss term, and FIG. 8F shows ground truth. FIG. 8B shows that training with $\mathcal{L}_C$ helps the network to capture the flipping kernel and accurate colors compared to FIG. 8B. FIG. 8E demonstrates that training with $\mathcal{L}_D$ can assist the network to learn the flipping direction in the front and back focus, where the views rotate around the focal plane as shown in the GT.

In an embodiment, the neural network module 152 performs training of the decoders in two steps. At block 205, in a first step, the neural network module 152 performs training with image patches from the DP dataset to optimize only the DP-view synthesis task. During this step, the weights of the deblurring decoder branch ($Dec_s$) are frozen. Once the model converges for the DP-view synthesis branches, in a second step at block 206, the weights of $Dec_s$ are unfrozen and the neural network module 152 performs fine-tuning using image patches from the deblurring dataset to optimize jointly for both the defocus deblurring and DP-view synthesis tasks. For the first step, the neural network module 152 trains the artificial neural network with the following loss terms:

$$\mathcal{L}_{ST1} = \mathcal{L}_{MSE}(l,r) + \mathcal{L}_C + \mathcal{L}_D \quad (8)$$

where $\mathcal{L}_{ST1}$ is the overall first-step loss and $\mathcal{L}_{MSE}(l,r)$ is the typical MSE loss between the GT and estimated DP views.

In various embodiments, as described above, image patches can be used to train the neural network; but at the inference or testing stages, the full image can be fed as input to the neural network. In general, patch sizes can be selected based on convolutional neural network (CNN) design. In particular, each CNN architecture design has a receptive field size that can be calculated based on how deep the CNN is adopted and what type of CNN layer is used (e.g., convolutional layer, max pooling layer, or the like). The receptive field can be defined as the size of a region in the input that produces a given feature (or image pixel in the output). It can be also defined as a region in the input space that a particular feature in the CNN (or image pixel in the output) is examining (i.e., being affected by). In this way, an input patch size can be selected based on the receptive field size, since selecting a larger size of input patches is generally redundant and the receptive field looks only at a specific region size in the input to produce a single pixel in the output. Generally for CNNs, it is not possible to select a patch size that is smaller than the receptive field size as it gives a logical design error. In most cases, the larger the receptive field, the better it is for training; however, there are restricting factors, such as deeper networks are hard to train and GPU memory limitations. In a particular case, square patches can be randomly selected from the input image for training purposes only.

The second step generally needs more careful loss setting to fine-tune the model in a way that guarantees improving performance on both tasks. In the second step, the artificial neural network is fine-tuned with the following loss terms:

$$\mathcal{L}_{ST2} = \mathcal{L}_{MSE}(s) + \lambda_1 \mathcal{L}_{MSE}(l,r) + \lambda_2 \mathcal{L}_C + \lambda_3 \mathcal{L}_D \quad (9)$$

where $\mathcal{L}_{ST2}$ is the overall second-step loss and $\mathcal{L}_{MSE}(S)$ is the typical MSE between the output deblurred image and the GT. The λ terms can be added to control the training process.

At blocks 208 to 212, the system 100 performs an inference stage. At block 208, the input module 150 receives a single input image to be deblurred. At block 210, the neural network module 152 passes the input image through the encoder of the trained DNN to map the input image into the latent space χ. At block 212, the neural network module 152 passes the encoded input image through the decoders of the trained DNN, including the left and right DP-view decoders ($Dec_l$ and $Dec_r$, respectively) and then the defocus deblurring decoder ($Dec_s$).

At block 214, the output module 154 outputs the output of the defocus deblurring decoder ($Dec_s$), representing a sharper output of the input that is defocus deblurred, to the output interface 136. In further cases, the output module 154 also outputs the output of the left and right DP-view decoders (Dec$_l$ and Dec$_r$, respectively), representing DP left and right views of the input defocused image.

In the present inventors' example experiments, the dataset of DP scenes for training was divided into 2,090 and 263 training and testing scenes, respectively. For the first training step, the 2,090 training scenes were used. For the second training step, DP data was used following the same data division; that is 350, 74, and 76 training, validation, and testing scenes, respectively.

The neural network module 152 extracts input image patches of size 512×512×3; the input patches determined as described herein. The convolutional layer weights were initialized using He's method and the Adam optimizer was used to train the neural network model. The mini-batch size in each iteration was set to 8 batches.

For the first training step, the initial learning rate was set to $3 \times 10^{-4}$, which is decreased by half every 8 epochs. The neural network model converged after 60 epochs in the first step. For the second step, the initial learning rate was set to $6 \times 10^{-4}$, which is decreased by half every 8 epochs. The model converged after 80 epochs. The A terms were set to 0.8, 0.5, and 0.5, respectively, in order to have a balanced loss minimization and to guide the network attention towards minimizing for defocus deblurring in the second step.

To evaluate the present embodiments in the example experiments, the test set of the Canon™ DP deblurring dataset was used. Specifically, this test set includes 37 indoor and 39 outdoor scenes. The results were compared against other approaches. Additionally, it was also compared against the DPDNet DP defocus deblurring approach that requires the availability of DP data at inference time. As the system 100 perform single-image defocus deblurring, the results of the DPDNet using single input images provide for a fair comparison. The present embodiments uses approaches that are fully convolutional so it can be tested on full-size images regardless of the patch size used for training.

TABLE 1 shows the quantitative results of the present embodiments against other single-image defocus deblurring approaches. These approaches are: the just noticeable defocus blur method (JNB), the edge-based defocus blur estimation method (EBDB), the deep defocus map estimation method (DMENet), and the DPDNet (single). As shown in TABLE 1, the present embodiments achieve substantially improved results for all metrics compared to other single-image defocus deblurring approaches. Furthermore, the present embodiments and DPDNet (single) have much lower inference time: greater than 1,200× faster compared to other approaches.

Though motion blur leads to image blur too, as defocus blur does, the physical formation, and consequently the appearance of the resultant blur is different. It was found that a significant degradation on the accuracy of approaches focused on motion blur when they are applied to defocus blur.

In TABLE 1, the results of the DP-based method (i.e., DPDNet), trained on single input, was reported. For the sake of completeness, the system 100 was compared against this method when it was fed with real DP data as input. TABLE 2 shows this comparison. As can be seen, the present embodiments achieve higher PSNR and MAE but lower SSIM compared to DPDNet, while the present embodiments are more practical as they require only single-input images compared to the DPDNet, which requires accessing the two DP images at the inference phase.

TABLE 2

| Method | PSNR ↑ | SSIM ↑ | MAE ↓ |
|---|---|---|---|
| DPDNet (real DP views) | 25.13 | 0.786 | 0.041 |
| DPDNet (synth. DP views) | 24.91 | 0.758 | 0.043 |
| Present Embodiments (single image) | 25.35 | 0.763 | 0.040 |

Figure 6A:
FIG. 6A shows an example input image with DoF blur.
Figure 6B:
FIG. 6B shows a deblurring result using edge-based defocus blur estimation with adaptive scale selection for the input image of FIG. 6A.
Figure 6C:
FIG. 6C shows a deblurring result using deep defocus map estimation using domain adaptation for the input image of FIG. 6A.
Figure 6D:
FIG. 6D shows a deblurring result for the input image of FIG. 6A using the system of FIG. 1.
Figure 6E:
FIG. 6E shows reconstructed DP views using the system of FIG. 1.
Figure 6F:
FIG. 6F shows ground-truth DP views for the input image of FIG. 6A.

As shown above, the present embodiments achieve better qualitative results when compared with several other single-image defocus deblurring methods. FIGS. 6A to 6F show an example of deblurring using other approaches and the multi-task framework of the present embodiments. FIG. 6A shows an input image with DoF blur. FIG. 6B shows a deblurring result using edge-based defocus blur estimation with adaptive scale selection. FIG. 6C shows a deblurring result using deep defocus map estimation using domain adaptation. FIG. 6D shows a deblurring result using the present embodiments. FIG. 6E shows reconstructed DP views using the present embodiments. FIG. 6F shows ground-truth DP views. As illustrated, the multi-task approach of the present embodiments has substantially better deblurring results and is able to produce accurate DP views from a single-image input image.

Figure 9A:
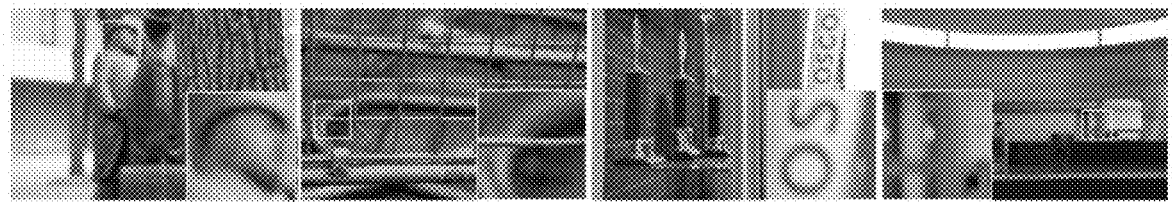
FIGS. 9A to 9F show a qualitative comparison with single-image defocus deblurring approaches on a test dataset, where
Figure 9B:
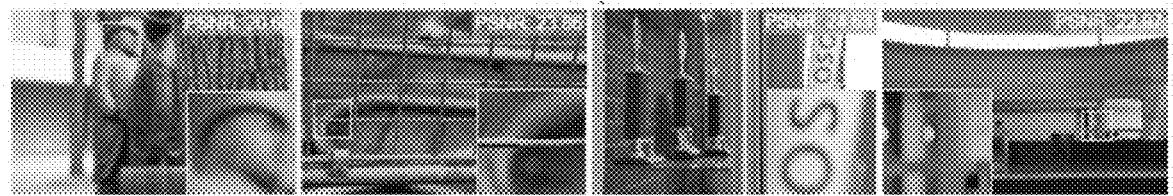
Figure 9C:
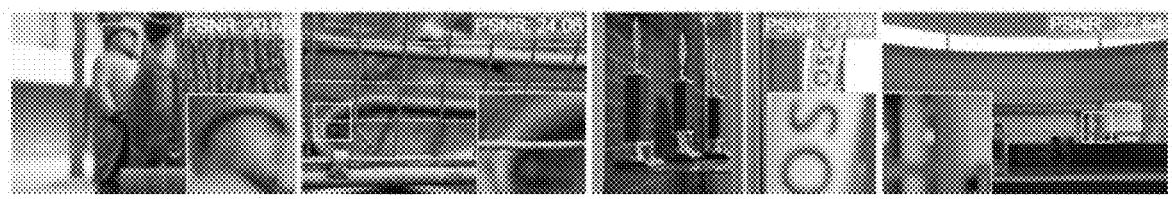

Additional qualitative comparisons are shown in FIGS. 9A to 9F, where the present results are compared against the results of the EBDB, DMENet, and the DPDNet (single) approaches. FIGS. 9A to 9F show a qualitative comparison with single-image defocus deblurring methods on the test set of the Canon™ DP deblurring dataset. FIG. 9A shows input images, FIG. 9B shows outputs of the single-image defocus deblurring method EBDB, FIG. 9C shows outputs of the

TABLE 1

Figure 9D:
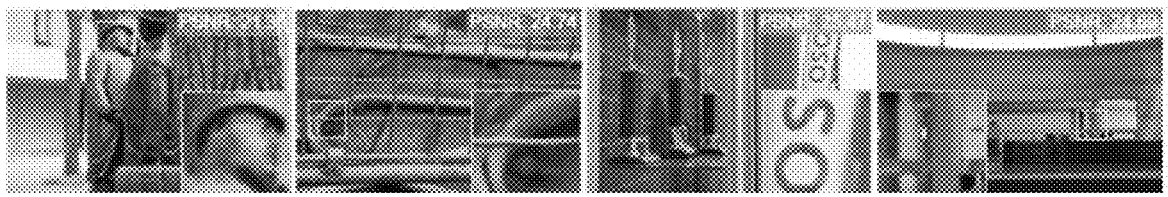
Figure 9E:
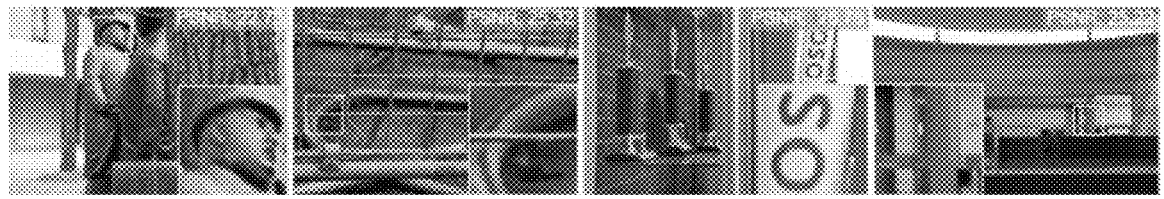
Figure 9F:
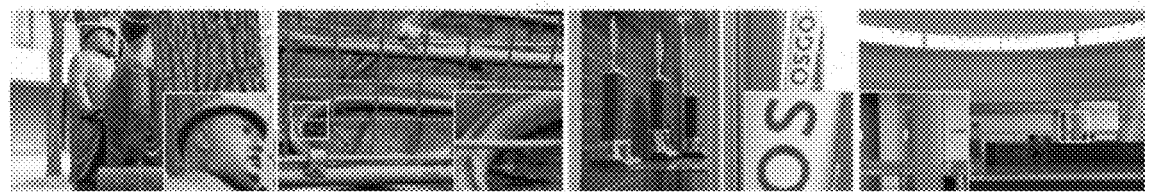

| | Indoor | | | Outdoor | | | Indoor & Outdoor | | | |
|---|---|---|---|---|---|---|---|---|---|---|
| METHOD | PSNR ↑ | SSIM ↑ | MAE ↓ | PSNR ↑ | SSIM ↑ | MAE ↓ | PSNR ↑ | SSIM ↑ | MAE ↓ | Time ↓ |
| JNB | 26.73 | 0.828 | 0.031 | 21.10 | 0.608 | 0.064 | 23.84 | 0.715 | 0.048 | 843.1 |
| EBDB | 25.77 | 0.772 | 0.040 | 21.25 | 0.599 | 0.058 | 23.45 | 0.683 | 0.049 | 929.7 |
| DMENet | 25.70 | 0.789 | 0.036 | 21.51 | 0.655 | 0.061 | 23.55 | 0.720 | 0.049 | 613.7 |
| DPDNet (single) | 26.54 | 0.816 | 0.031 | 22.25 | 0.682 | 0.056 | 24.34 | 0.747 | 0.044 | 0.5 |
| Present Embodiments | 28.02 | 0.841 | 0.027 | 22.82 | 0.690 | 0.052 | 25.35 | 0.763 | 0.040 | 0.5 | single-image defocus deblurring method DMENet, FIG. 9D shows outputs of the single-image defocus deblurring method DPDNet (single), FIG. 9E shows outputs of the present embodiments, and FIG. 9F shows ground truth images. As evidenced, the present embodiments produces the best quantitative and qualitative results.

Figure 12A:
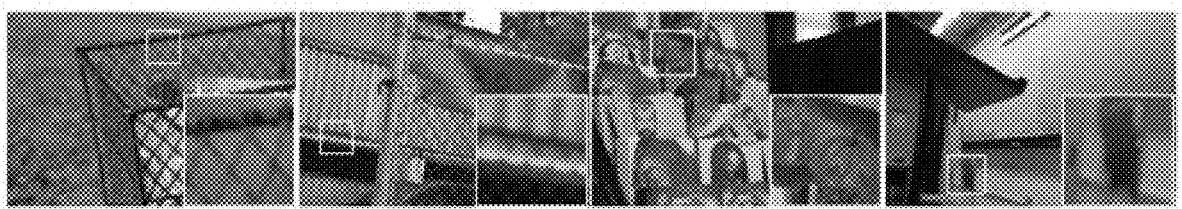
FIGS. 12A to 12F illustrate additional qualitative comparisons with other single-image defocus deblurring approaches on a test dataset, where
Figure 12B:
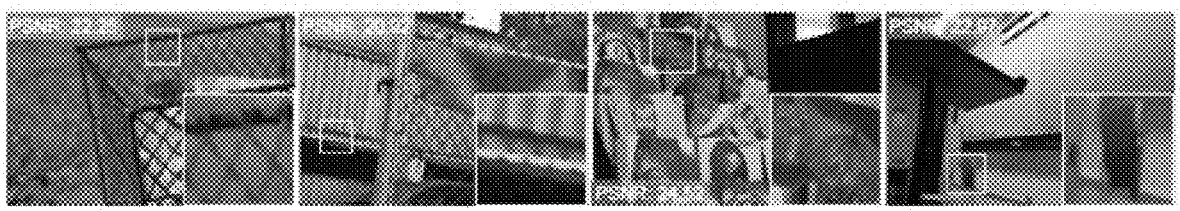
Figure 12C:
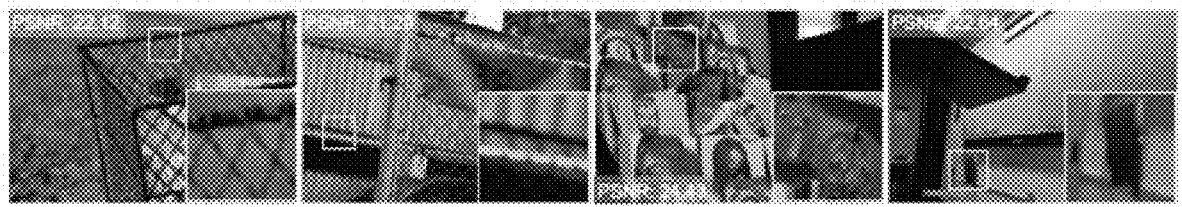
Figure 12D:
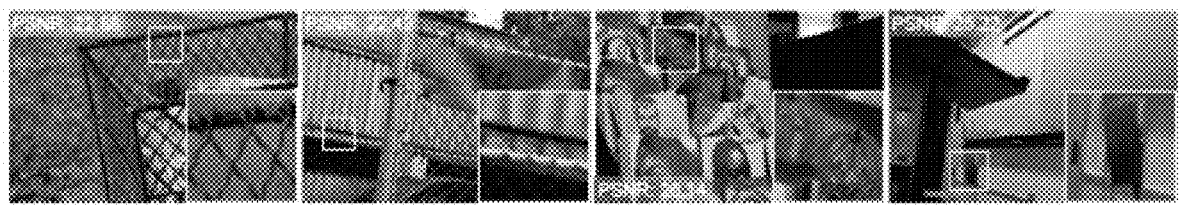
Figure 12E:
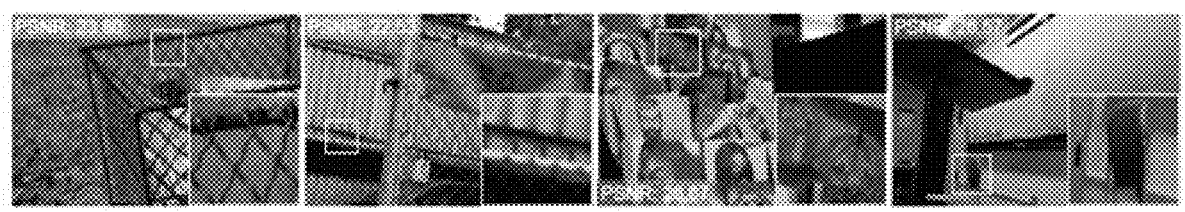
Figure 12F:
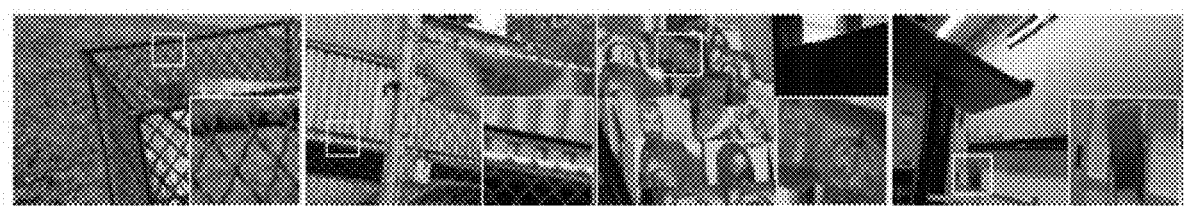

FIGS. 12A to 12F illustrate additional qualitative comparisons with other single-image defocus deblurring approaches on the test set of the Canon™ DP dataset. FIG. 12A shows input images, FIG. 12B shows outputs of the single-image defocus deblurring method EBDB, FIG. 12C shows outputs of the single-image defocus deblurring method DMENet, FIG. 12D shows outputs of the single-image defocus deblurring method DPDNet (single), FIG. 12E shows outputs of the present embodiments, and FIG. 12F shows ground truth images.

The example experiments also investigated the utility of having multiple weight sharing stages by introducing a variation of multi-task DP ("MDP") network with different multi-decoder stitching options: (1) no stitching that makes the latent space $\chi$ the only weight sharing stage, (2) late-stage stitching at the last block, and (3) the MDP with middle-stage stitching. TABLE 3 reports results from an ablation study performed to examine the effectiveness of the multi-decoder stitching design for defocus deblurring. Results reported are on the Canon™ DP deblurring dataset.

TABLE 3

| MDP variation | PSNR ↑ | SSIM ↑ | MAE ↓ |
| --- | --- | --- | --- |
| MDP (no stitching) | 25.03 | 0.757 | 0.042 |
| MDP (late-stage stitching) | 25.16 | 0.759 | 0.041 |
| MDP (middle-stage stitching) | 25.35 | 0.763 | 0.040 |

The results in TABLE 3 show that middle-stage stitching achieves the best results as it allows weight sharing at multiple stages compared with the no stitching variation. On the other hand, there is a noticeable drop in the deblurring performance when late-stage stitching is applied as the sharpness of the deblurring decoder (i.e., $Dec_s$) is affected by the half-PSF blur present in feature maps of the synthesized DP views (i.e., $Dec_l$ and $Dec_r$) at this later stage.

FIGS. 13A to 13D show an example of a qualitative comparison with single-image defocus deblurring approaches on various camera devices. FIG. 13A is the input image. FIG. 13B is the single-image defocus deblurring approach of EBDB. FIG. 13C is the single-image defocus deblurring approach of DPDNet (single). FIG. 13D shows the output of the present embodiments. As shown, the present embodiments generalize well for unseen cameras during the training stage and produces the best qualitative results compared with other approaches.

Figure 14A:
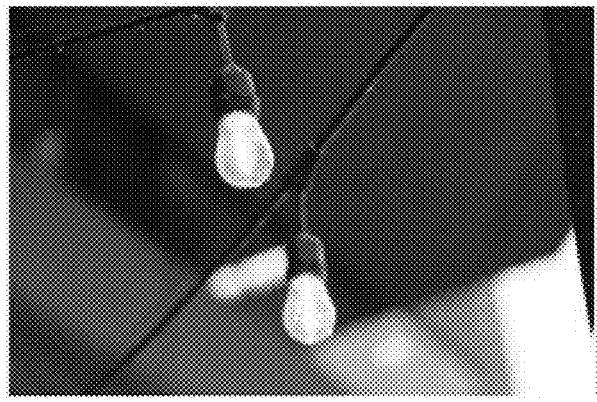
FIGS. 14A to 14D show an example from a newly captured DP dataset, where
Figure 14B:
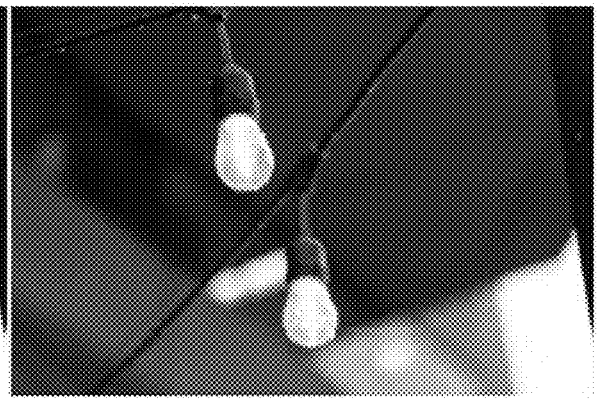
Figure 14C:
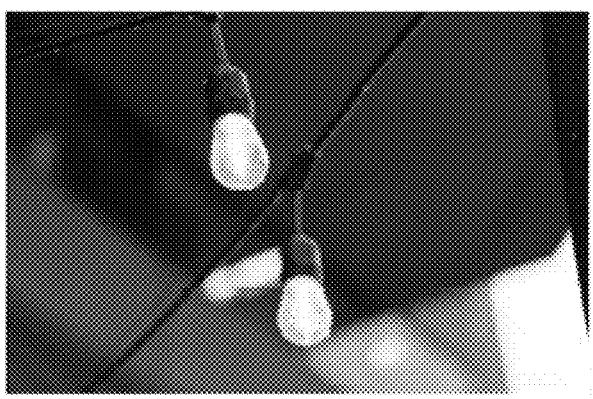
Figure 14D:
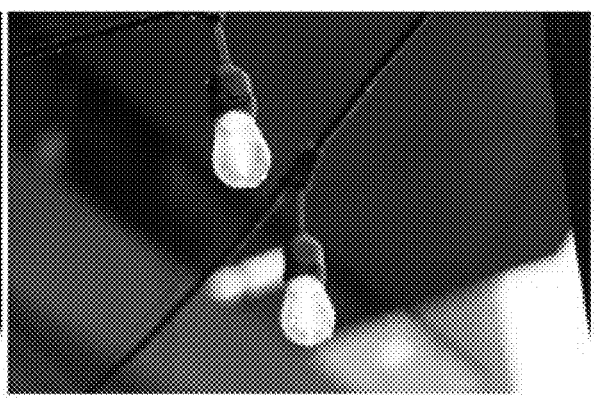

FIGS. 14A to 14D show an example from a newly captured DP dataset. FIG. 14A shows an input combined image $I_c$. FIG. 14B shows a still frame from an image motion of eight views generated using the multi-task DP network of the present embodiments. FIG. 14C shows a still frame from animated results of the synthesized DP views. FIG. 14D shows a still frame from animated ground truth DP views. It is evidenced that the present embodiments are able to generate high-quality eight/DP views.

Figure 15A:
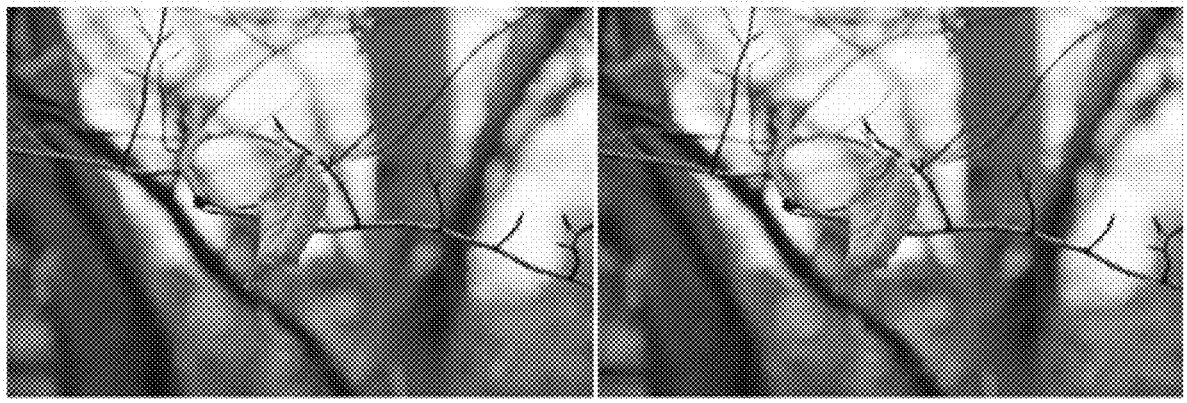
FIGS. 15A to 15D show an additional example from a captured DP dataset, where
Figure 15B:
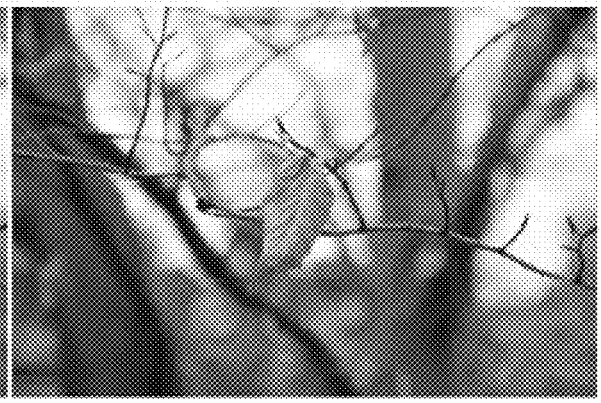
Figure 15C:
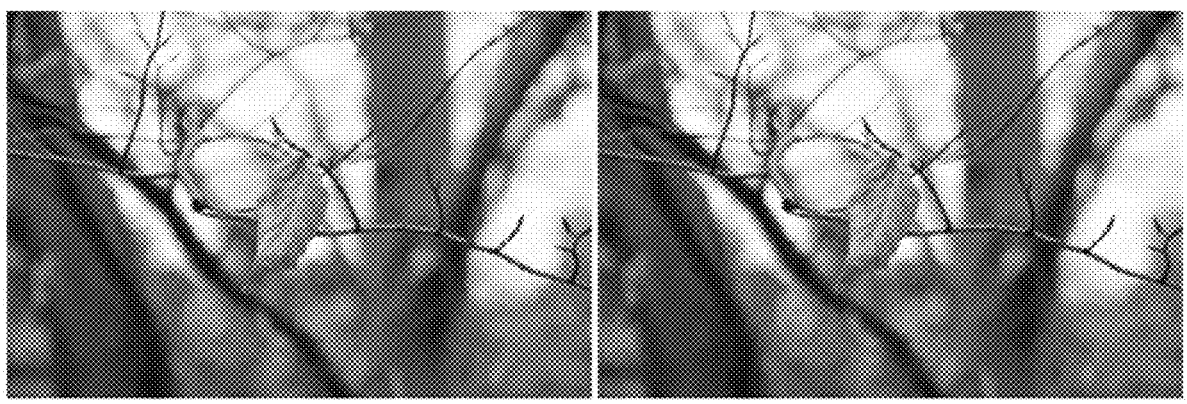
Figure 15D:
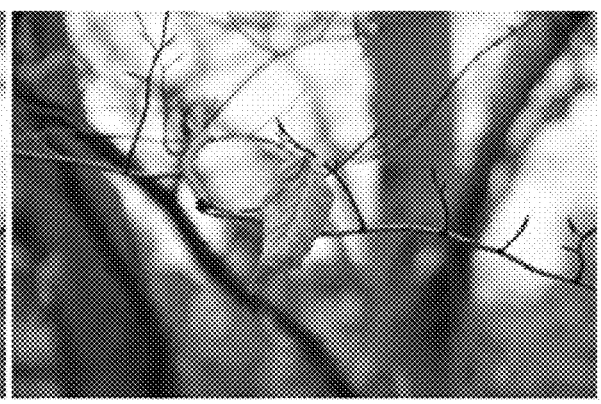

FIGS. 15A to 13D show an additional example from the captured DP dataset. FIG. 15A shows an input combined image $I_c$. FIG. 15B shows a still frame from an image motion of eight views generated using the MDP of the present embodiments. FIG. 15C shows a still frame from animated results of the synthesized DP views synthesized by the present embodiments. FIG. 15D shows a still frame from animated ground truth DP views.

Figure 16A:
FIGS. 16A to 16D show an additional example from a captured DP dataset, where
Figure 16B:
Figure 16C:
Figure 16D:

FIGS. 16A to 16D show an additional example from the captured DP dataset. FIG. 16A shows an input combined image $I_c$. FIG. 16B shows a still frame from an image motion of eight views generated using the MDP of the present embodiments. FIG. 16C shows a still frame from animated results of the synthesized DP views synthesized by the present embodiments. FIG. 16D shows a still frame from animated ground truth DP views.

Figures 17A, 17B:
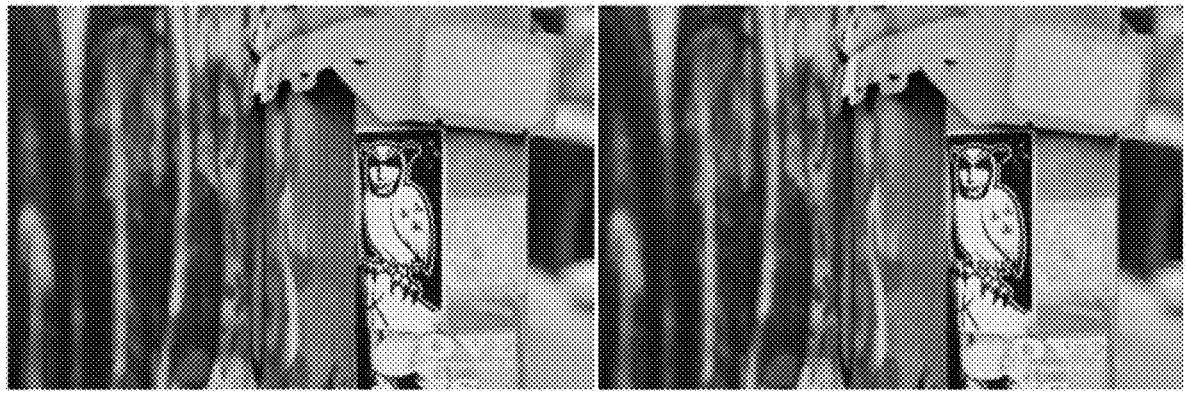
FIGS. 17A to 17D show an additional example from a captured DP dataset, where
Figures 17C, 17D:

FIGS. 17A to 17D show an additional example from the captured DP dataset. FIG. 17A shows an input combined image $I_c$. FIG. 17B shows a still frame from an image motion of eight views generated using the MDP of the present embodiments. FIG. 17C shows a still frame from animated results of the synthesized DP views synthesized by the present embodiments. FIG. 17D shows a still frame from animated ground truth DP views.

Figure 18:
FIG. 18 shows an additional example of multi-view synthesis using the system of FIG. 1 applied to other cameras than that used for training.

FIG. 18 shows an additional example of multi-view synthesis using the multi-task DP network of the present embodiments applied to other cameras than that used for training. These results are synthesized from a single input image captured by new camera devices, in which they do not have the ground truth DP views. The multi-task DP network of the present embodiments produces high-quality eight views that can be used to create an aesthetically pleasing image motion. Furthermore, these results demonstrate a good generalization ability of the network as it can provide high-quality views from images that are captured by unseen camera device during the training stage.

Figure 3:
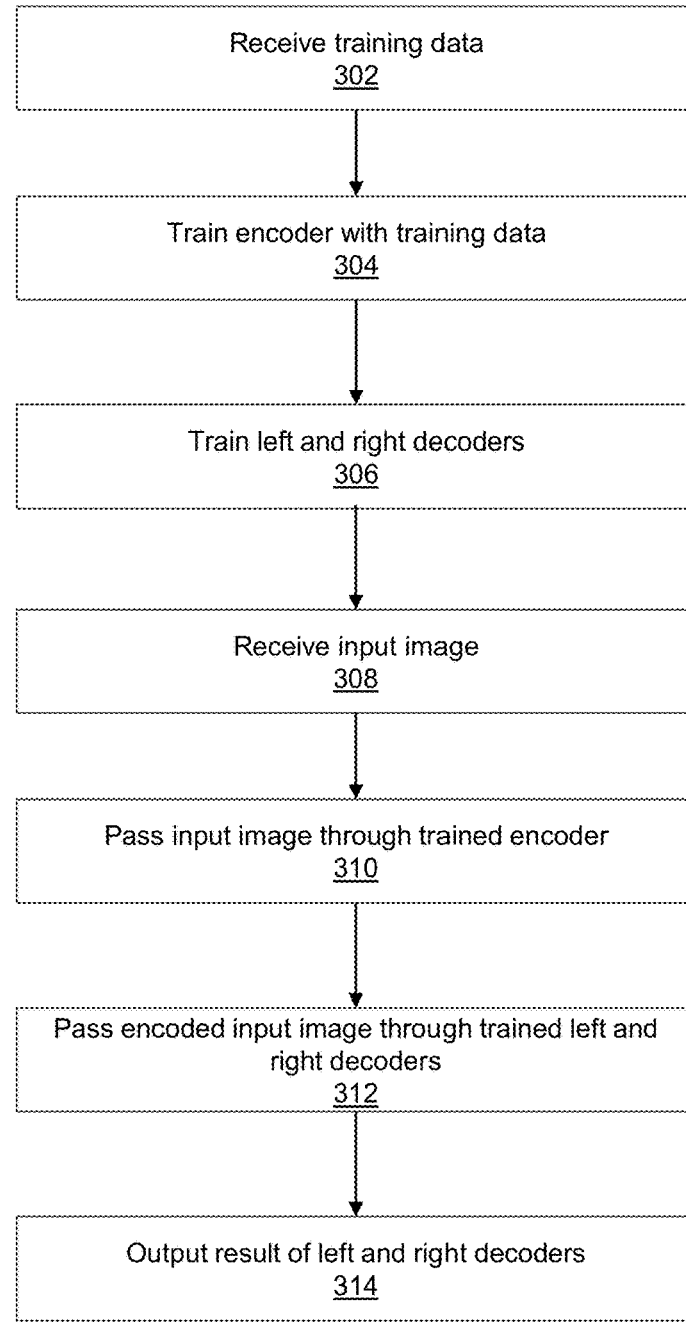
FIG. 3 is a flowchart of a method of predicting dual pixel views of an image, in accordance with an embodiment.

In an embodiment, the multi-task framework of the present embodiments can be used to, not only reduce defocus blur, but also to predict DP views of the input single image. The multi-task framework allows for the improvement of the results of each task, due to inherent correlation. Turning to FIG. 3, shown therein is a flowchart for a method of predicting dual pixel views of an image 300, in accordance with an embodiment.

At block 302, the input module 150 receives the training data comprising the dataset of DP scenes for training the artificial neural network.

At block 304, the neural network module 152 trains the artificial neural network by training the encoder (Enc) task in the DNN to map the input image into the latent space $\chi$, as described herein. Then, at block 306, the neural network module 152 trains the left and right DP-view decoders ($Dec_l$ and $Dec_r$, respectively), with image patches from the DP dataset, as described herein.

At blocks 308 to 312, the system 100 performs the inference stage. At block 308, the input module 150 receives a single input image to predict the respective DP views. At block 310, the neural network module 152 passes the input image through the encoder of the trained DNN to map the input image into the latent space $\chi$. At block 312, the neural network module 152 passes the encoded input image through the decoders of the trained DNN, including the left and right DP-view decoders ($Dec_l$ and $Dec_r$, respectively).

At block 314, the output module 154 outputs the output of the left and right DP-view decoders ($Dec_l$ and $Dec_r$, respectively), being the predicted DP images, to the output interface 136.

TABLE 4 shows the results of training a single model (with approximately the same capacity of the multi-task framework) on each task separately. TABLE 4 also shows the results of training both single and multi-task frameworks with and without the previously described DP-based loss functions. As shown, the multi-task framework of the present embodiments with the associated loss functions achieved the best results.

TABLE 4

| Method | Defocus Deblurring | | DP-Pixel Synthesis | |
|---|---|---|---|---|
| | PSNR ↑ | SSIM ↑ | PSNR ↑ | SSIM ↑ |
| Single-task w/o $\mathcal{L}_C$ and $\mathcal{L}_D$ | 24.34 | 0.747 | 37.05 | 0.953 |
| Single-task w/ $\mathcal{L}_C$ and $\mathcal{L}_D$ | N/A | N/A | 38.23 | 0.962 |
| Multi-task w/o $\mathcal{L}_C$ and $\mathcal{L}_D$ | 24.81 | 0.750 | 38.01 | 0.957 |
| Multi-task w/ $\mathcal{L}_C$ and $\mathcal{L}_D$ | 25.35 | 0.763 | 39.17 | 0.973 |

Figure 4:
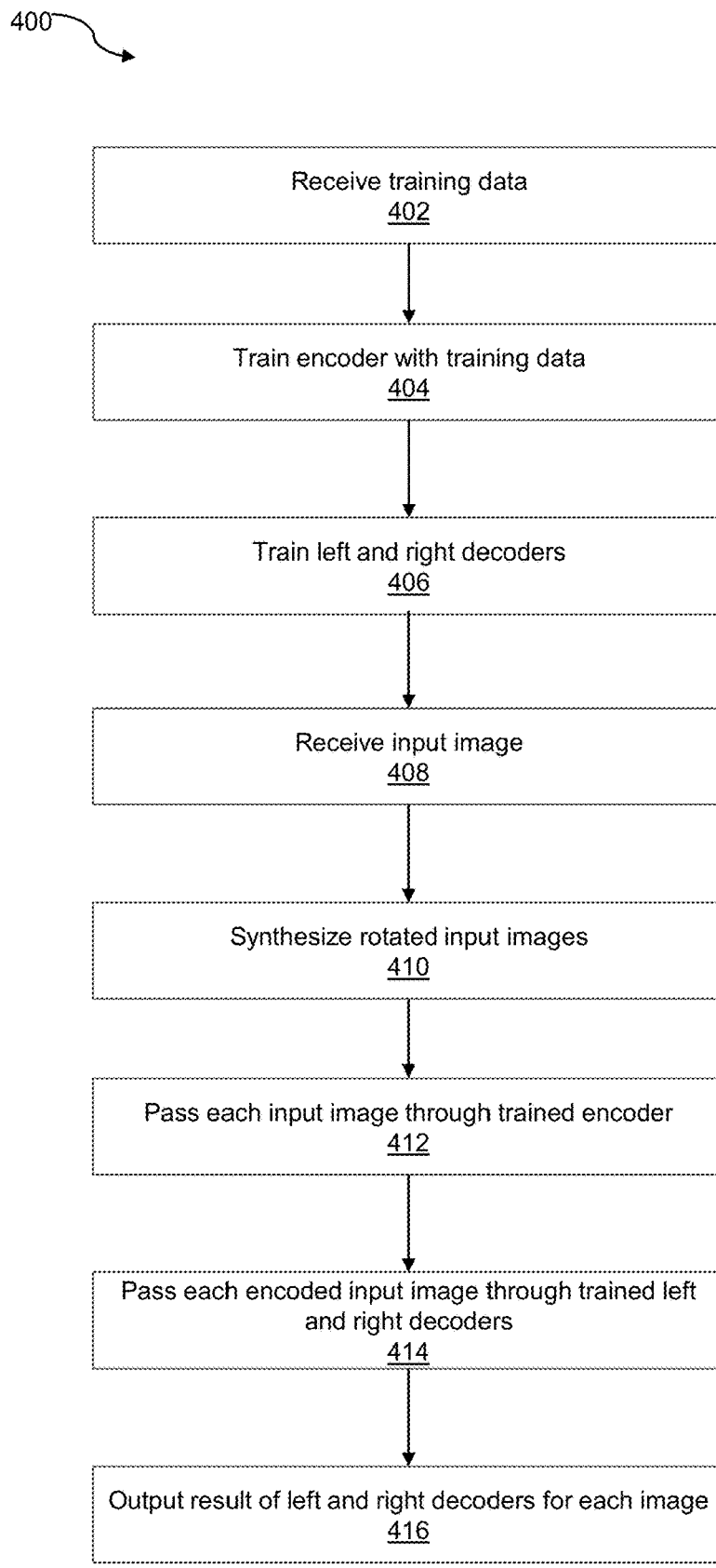
FIG. 4 is a flowchart of a method of performing view synthesis using dual pixel views of an image, in accordance with an embodiment.

In another embodiment, the multi-task framework of the present embodiments can be used to perform view synthesis using the synthesis module 160. In an example, the synthesis module 160 can generate an aesthetically realistic image motion by synthesizing a multi-view version of a given single image. The DP two sup-aperture views of the scene depend on the sensor's orientation, and the DP dataset contains left/right DP pairs. Consequently, the synthesis module 160, using the output of the neural network module 152, can synthesize the horizontal DP disparity. Turning to FIG. 4, shown therein is a flowchart for a method of performing view synthesis using dual pixel views of an image 400, in accordance with an embodiment At block 402, the input module 150 receives the training data comprising the dataset of DP scenes for training the artificial neural network.

At block 404, the neural network module 152 trains the artificial neural network by training the encoder (Enc) task in the DNN to map the input image into the latent space $\chi$, as described herein. Then, at block 406, the neural network module 152 trains the left and right DP-view decoders (Dec$_l$ and Dec$_r$, respectively), with image patches from the DP dataset, as described herein.

At blocks 408 to 414, the system 100 performs the inference stage.

Figure 10:
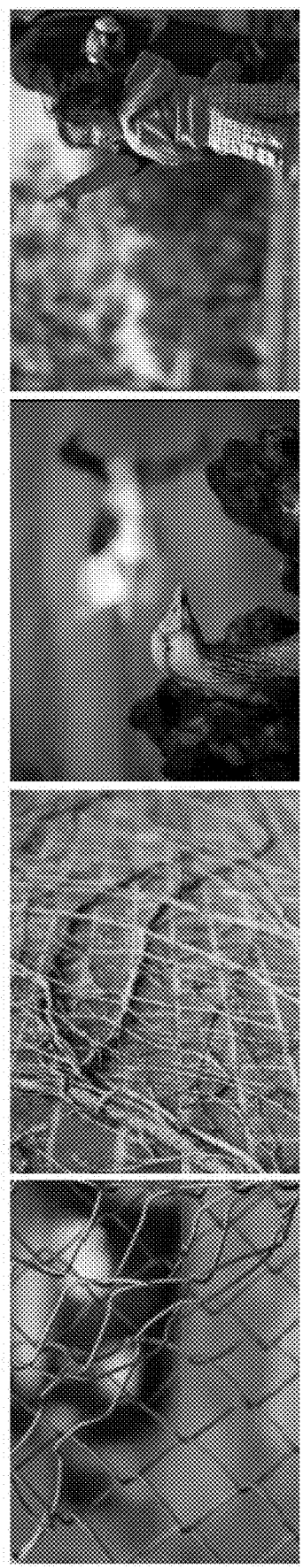
FIG. 10 illustrates example stills of motion from reconstructed views.

At block 408, the input module 150 receives a single input image. At block 410, the synthesis module 160 synthesizes additional views with different 'DP disparity' by rotating the input image before feeding it to the artificial neural network by a 45 clockwise step three times (i.e., 45, 90, 135). In other cases, other suitable rotation directions and amounts can be used. This allows the system 100 to produce a smooth motion from the reconstructed eight views, as exemplified in the example stills of motion shown in FIG. 10.

At block 412, the neural network module 152 passes each of the rotated input images through the encoder of the trained DNN to map the input images into the latent space $\chi$. At block 414, the neural network module 152 passes each of the encoded input images through the decoders of the trained DNN, including the left and right DP-view decoders (Dec$_l$ and Dec$_r$, respectively).

At block 416, the output module 154 outputs the output of the left and right DP-view decoders (Dec$_l$ and Dec$_r$, respectively) for each decoded image, representing synthesized DP left and right views, to the output interface 136.

The synthesized DP views can be leveraged for a DP-based approach in the absence of actual DP data. The present inventors validated this approach using the reconstructed DP views as a proxy to DP data on the reflection removal and defocus deblurring tasks. Specifically, real DP data and the generated DP data were processed using the DP-based reflection removal (DPRR) and defocus deblurring (DPD-Net) methods.

Figure 11:
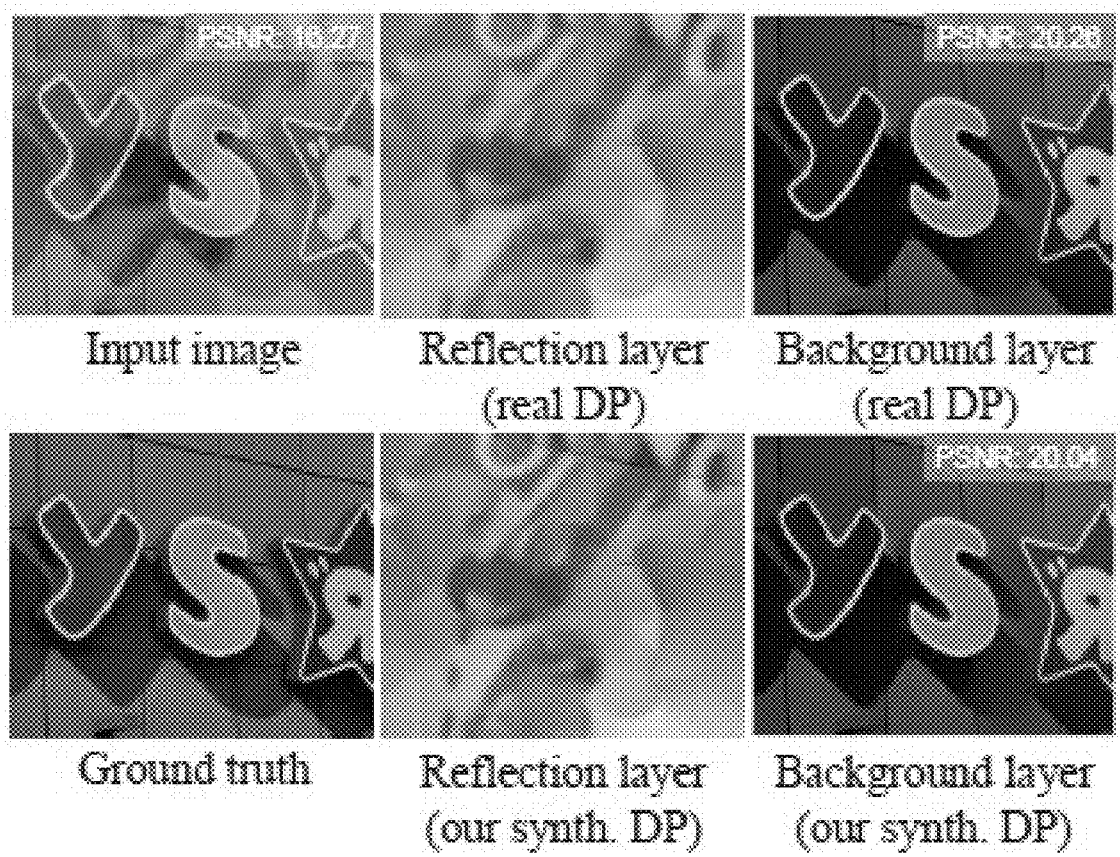
FIG. 11 illustrates an example of synthetic DP views generated by the system of FIG. 1 used as input for DP-based reflection removal.

As shown in FIG. 11, utilizing the synthetic DP views produces approximately the same high-quality result as using DPRR on real DP data. This allows the present embodiments to achieve better reflection removal results, while still requiring only a single input image, compared to other approaches for reflection removal. TABLE 5 shows the quantitative results for reflection removal on a test dataset. When using the synthetic DP views, the dual-pixel reflection removal (DPRR) method achieves on-par results compared with using real DP views, which makes the DPRR method applicable with the absence of real DP data.

TABLE 5

| Single-image | | Non single-image | |
|---|---|---|---|
| Method | PSNR | Method | PSNR |
| ZN18 | 15.57 | LB13 | 16.12 |
| YG18 | 16.49 | GC14 | 16.02 |
| DPRR (present embodiments) | 19.32 | DPRR (real DP) | 19.45 |

The example experiments demonstrate that a DNN trained for the purpose of single-image defocus deblurring can be substantially improved by incorporating the additional task of synthesizing the two DP views associated with the input image. A substantial benefit of the present embodiments is that capturing data for the DP view synthesis task is easy to perform and requires no special capture setup. This is contrasted with other approaches that require careful capture of sharp/blurred image pairs for the deblurring task. This multi-task approach of the present embodiments is able to improve deblurring results by close to 1 dB in terms of PSNR. Additionally, the DNN is able to perform realistic view synthesis that can be used for tasks such as reflection removal.

In some cases, the present embodiments can be used to apply synthetic shallow depth-of-field (DoF). The shallow DoF is typically synthesized for a pleasing aesthetic quality of out-of-focus blur in a photograph. The present embodiments enable high-quality multi-view synthesis from a single image through applying rotated blurring kernels based on dual-pixel image formation. Given the synthesized multiple views, an aesthetically realistic image motion effect can be generated.

Figure 19:
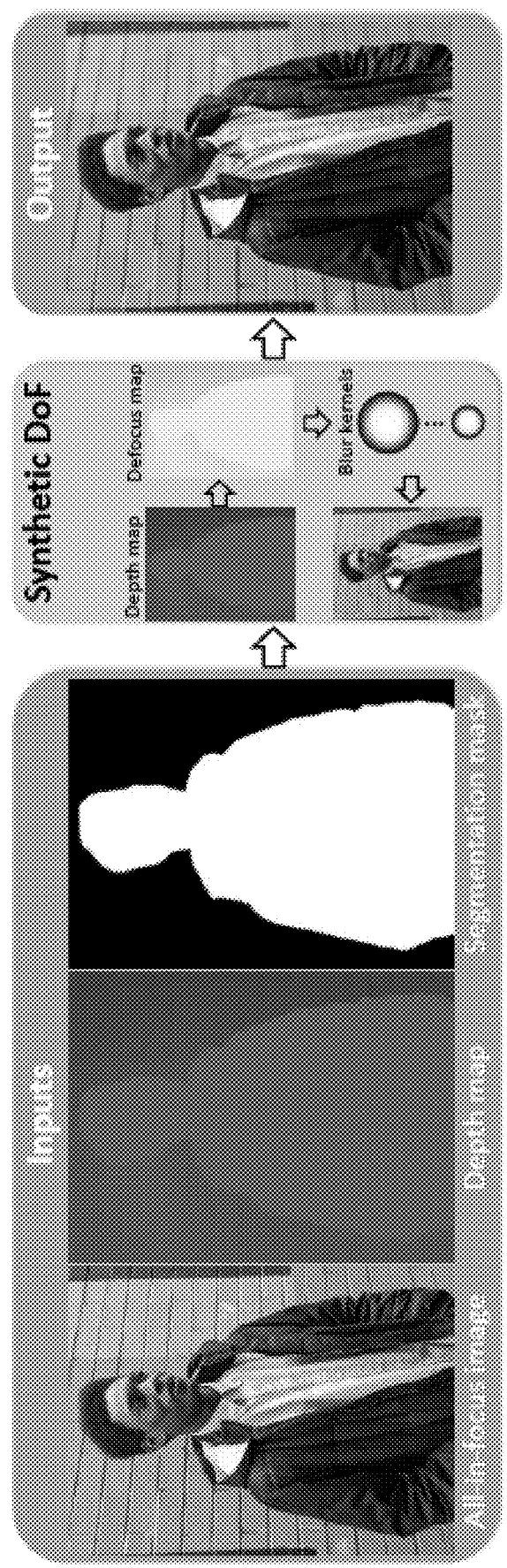
FIG. 19 shows an illustrative example of a synthetic Bokeh effect in accordance with the system of FIG. 1.

Unlike Digital Single Lens Reflex (DSLR) cameras, standard smartphone cameras cannot produce natural shallow depth-of-field (DoF) as they have a relatively small aperture and short focal length. Smartphone cameras cannot employ DSLR's optics and imaging system due to the limited on-device physical dimensions. Therefore, smartphone manufacturers tend to provide what is referred to as a 'portrait mode' in order to apply synthetic shallow DoF to isolate a subject from elements in the background of the photograph (i.e., synthetic Bokeh effect). The 'portrait mode', or the synthetic Bokeh effect, typically takes an input large DoF image (nearly all-in-focus image) along with an estimated depth map to determine the blur kernel size at each pixel (i.e., defocus map). In some cases, a person segmentation mask is used to avoid blurring pixels that belong to the people and their accessories. FIG. 19 shows an illustrative example of the synthetic Bokeh effect framework. This framework takes three inputs: single image, estimated depth map, and segmentation mask. Given the inputs, a synthetic DoF unit produces the desired image. In contrast to this framework, the present embodiments apply rotated blurring kernels in order to generate multiple views. The defocus blur kernel shape is determined based on sub-aperture image formation, as described herein, for use in dual-pixel (DP) sensors.

Figure 20:
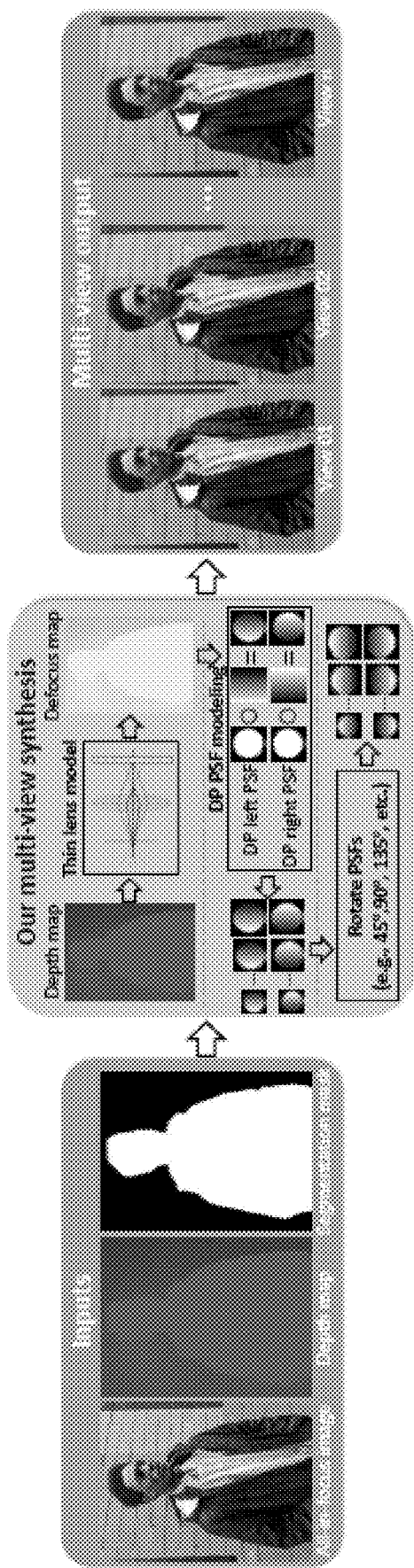
FIG. 20 illustrates a diagrammatic example of a framework for multi-view synthesis based on rotated DP blur kernels, in accordance with the system of FIG. 1.

FIG. 20 illustrates a diagrammatic example of a framework for multi-view synthesis based on rotated DP blur kernels, in accordance with the present embodiments. This framework takes three inputs: single image, estimated depth map, and segmentation mask. Given the inputs, the synthesis module 160 produces n views based on a number of rotated PSFs.

Figure 21:
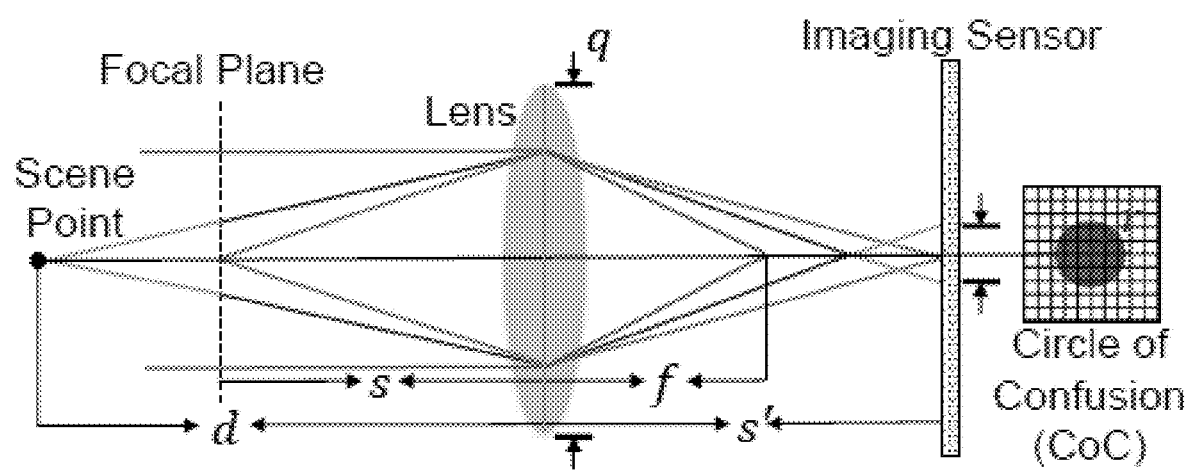
FIG. 21 illustrates a diagrammatic example of a thin lens model and dual-pixel image formation.

FIG. 21 illustrates a diagrammatic example of a thin lens model and dual-pixel image formation. The circle of confusion (CoC) size is calculated for a given scene point using its distance from the lens, camera focal length, and aperture size. The size of the PSFs at each pixel in the image can be determined using a depth map. Therefore, camera optics are modelled using a thin lens model that assumes negligible lens thickness to simplify optical ray tracing calculations. Through this model, the synthesis module 160 can approximate the circle of confusion (CoC) size for a given point based on its distance from the lens and camera parameters (i.e., focal length, aperture size, and focus distance). This model is illustrated in FIG. 21, where f is the focal length, s is the focus distance, and d is the distance between the scene point and camera lens. The distance between the lens and sensor s', and the aperture diameter q are defined as:

$$s' = \frac{fs}{s-f} \quad (10)$$

$$q = \frac{f}{F} \quad (11)$$

where F is the f-number ratio.

The CoC radius r of a scene point located at distance d from the camera is:

$$r = \frac{q}{2} \times \frac{s'}{s} \times \frac{d-s}{d} \quad (12)$$

Once the radius of the PSF is calculated at each pixel, the synthesis module 160 determines the PSF shape to be applied. A DP-based PSF shape is adopted for DP view synthesis. Generally, the light rays coming from scene points that are within a camera's DoF exhibit little to no difference in phase between the views. On the other hand, light rays coming from scene points outside the camera's DoF exhibit a noticeable defocus disparity in the left-right views. The amount of defocus disparity is correlated to the amount of defocus blur.

Unlike traditional stereo, the difference between the DP views can be modeled as a latent sharp image being blurred in two different directions using a half-circle PSF. This is illustrated in the resultant CoC of FIGS. 5C and 5D. On real DP sensors, the ideal case of a half-circle CoC is only an approximation due to constraints of the sensor's construction and lens array. These constraints allow a part of the light ray bundle to leak into the other-half dual pixels. To this end, the DP PSF can be modeled as a circle C that is element-wise multiplied by a ramp mask as follows:

$$H_l = C \circ M_l, \text{s.t. } H_l \geq 0, \text{ with } \Sigma H_l = 1 \quad (13)$$

where ∘ denotes element-wise multiplication, $M_l$ is a 2D ramp mask with a constant intensity fall-off towards the right direction, and $H_l$ is the left DP PSF.

A useful property of the DP sensors that the right DP PSF $H_r$ is the $H_l$ that is flipped around the vertical axis i.e., $H_l^f$:

$$H_r = H_l^f \quad (14)$$

Another useful property of the DP PSFs is that the orientation of the "half CoC" of each left/right view reveals if the scene point is in front or back of the focal plane.

The synthesis module 160 uses an estimated depth map to apply synthetic defocus blur in the process of generating shallow DoF image. To blur an image based on the computed CoC radius r, the synthesis module 160 first decomposes the image into discrete layers according to per-pixel depth values, where the maximum number of layers is set to a predetermined value (for example, 500). Then, the synthesis module 160 convolves each layer with the DP PSF, blurring both the image and mask of the depth layer. Then, the synthesis module 160 composes the blurred layer images in order of back-to-front, using the blurred masks. For an all-in-focus input image $I_s$, the synthesis module 160 generates two images, the left $I_l$ and right $I_r$ sub-aperture DP views, as follows:

$$I_l = I_s * H_l \quad (15)$$

$$I_r = I_s * H_r \quad (16)$$

For simplicity, let $I_s$ be a patch with all pixels from the same depth layer. Where * denotes the convolution operation.

The final output image $I_b$ (i.e., synthetic shallow DoF image) can be obtained as follows:

$$I_b = \frac{I_l + I_r}{2} \quad (17)$$

Figure 22A:
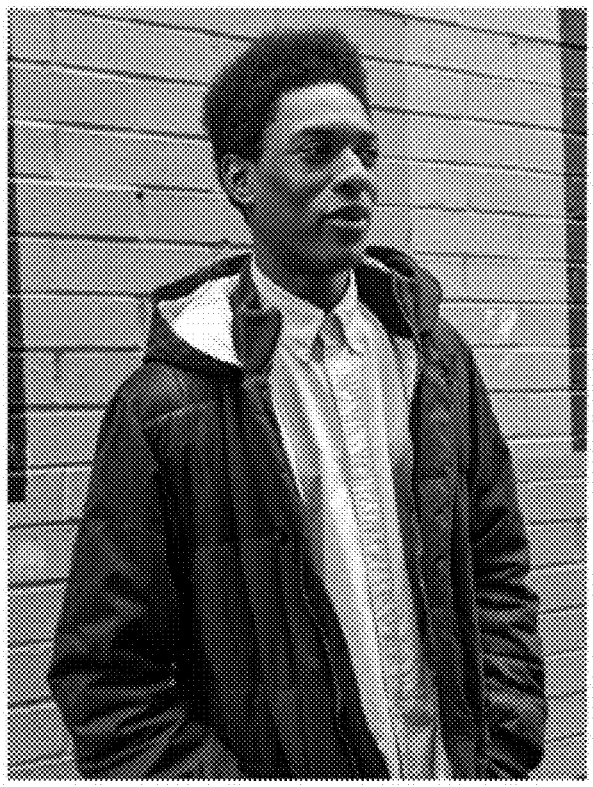
FIGS. 22A and 22B illustrate an example of synthetic DP views in accordance with the system of FIG. 1, where
Figure 22B:
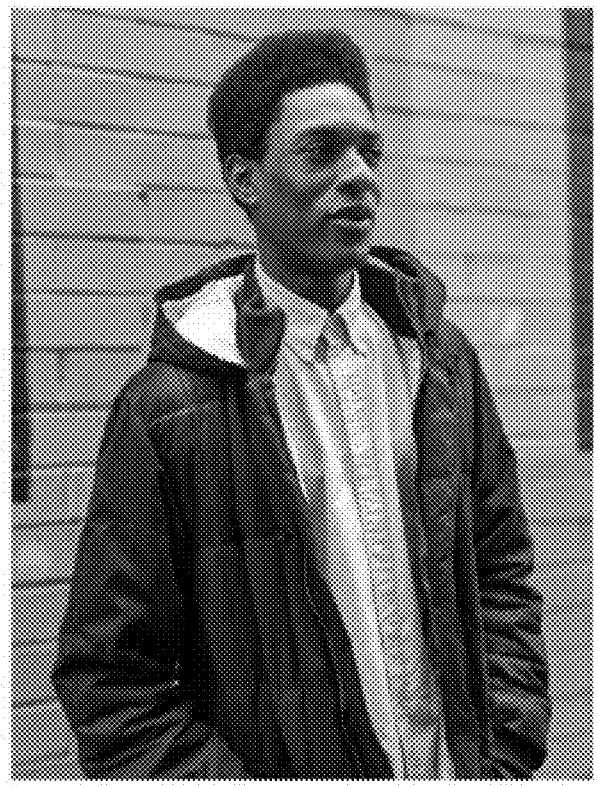
Figure 23A:
FIGS. 23A and 23B illustrate another example of synthetic DP views in accordance with the system of FIG. 1, where
Figure 23B:

The synthetically generated DP views of the present embodiments exhibit defocus disparity similar to what one would find in real DP data; where the in-focus regions show no disparity and the out-of-focus regions have defocus disparity. Results from our DP-view synthesis framework based on defocus blur in DP sensors. FIGS. 22A and 22B, and FIGS. 23A and 23B, illustrate examples of synthetic DP views in accordance with the present embodiments. FIGS. 22A and 23A show the all-in-focus input image and FIGS. 22B and 23B show the respective image with the synthetic Bokeh applied. As illustrated, the present embodiments produce DP views that have defocus disparity similar to the one found in real DP sensors.

Accordingly, the synthesis module 160 can generate multiple views from an all-in-focus image with its corresponding depth map. In some cases, the synthesis module 160 can generate an aesthetically realistic image motion by synthesizing a multi-view version of a given single image. The DP two sup-aperture views of the scene depend on the sensor's orientation and, in the present embodiments, the synthesis module 160 generates left/right DP pairs; consequently, the synthesis module 160 can synthesize the horizontal DP disparity. In some cases, additional views can be similarly synthesized with different 'DP disparity' by rotating the PSFs during the multi-view synthesis. For example, eight views can be generated by performing a 45° clockwise rotation step three times (i.e., 45°, 90°, 135°). This allows the synthesis module 160 to produce a smooth motion from the reconstructed eight views.

Although the invention has been described with reference to certain specific embodiments, various modifications thereof will be apparent to those skilled in the art without departing from the spirit and scope of the invention as outlined in the claims appended hereto. The entire disclosures of all references recited above are incorporated herein by reference.

The invention claimed is:

1. A method of determining synthetic dual-pixel data, the method comprising:
   receiving an input image;
   determining synthetic dual-pixel data using a trained artificial neural network with the input image as input to the trained artificial neural network, the trained artificial neural network comprises a latent space encoder, a left dual-pixel view decoder, and a right dual-pixel view decoder, the artificial neural network trained with a loss function comprising a dual-pixel-loss, a view difference loss, and a mean-square-error loss between ground truth and estimated dual-pixel views; and
   outputting the synthetic dual-pixel data.

2. The method of claim 1, wherein the artificial neural network is trained by inputting a training dataset of images and optimizing for a loss function that imposes a constraint on dual-pixel view reconstruction and a view difference loss function.

3. The method of claim 2, wherein the training dataset of images comprises a plurality of scenes, each scene comprising both dual pixel images capturing the scene.

4. The method of claim 1, wherein the left dual-pixel view decoder and the right dual-pixel view decoder comprise an early-stage weight sharing at the end of the latent space encoder.

5. The method of claim 1, further comprising performing deblurring of the input image and outputting a deblurred image, wherein the trained artificial neural network further comprises a deblurring decoder, and wherein the deblurred image comprises the output of the deblurring decoder.

6. The method of claim 1, further comprising predicting dual pixel views of the input image by outputting the output of the left dual-pixel view decoder and the right dual-pixel view decoder.

7. The method of claim 6, further comprising performing reflection removal, defocus deblurring, or both, using the predicted dual pixel views.

8. The method of claim 1, further comprising performing view synthesis using the input image, wherein determining the synthetic dual-pixel data comprises passing each of a plurality of rotated views of the input image as input to the trained artificial neural network, and wherein the view synthesis comprises a combination of the output of the left dual-pixel view decoder and the output of the right dual-pixel view decoder for each of the rotated view of the input image.

9. The method of claim 8, further comprising synthesizing image motion by rotating point spread functions through a plurality of different angles during the view synthesis.

10. A system for determining synthetic dual-pixel data, the system comprising a processing unit and non-transitory computer readable storage media, the non-transitory computer readable storage media comprising instructions for the processing unit to execute:
    an input module to receive an input image;
    a neural network module to determine synthetic dual-pixel data using a trained artificial neural network with the input image as input to the trained artificial neural network, the trained artificial neural network comprises a latent space encoder, a left dual-pixel view decoder, and a right dual-pixel view decoder, the artificial neural network trained with a loss function comprising a dual-pixel-loss, a view difference loss, and a mean-square-error loss between ground truth and estimated dual-pixel views; and
    an output module to output the synthetic dual-pixel data.

11. The system of claim 10, wherein the artificial neural network is trained by inputting a training dataset of images and optimizing for a function that imposes a constraint on dual-pixel view reconstruction and a view difference loss function.

12. The system of claim 11, wherein the training dataset of images comprises a plurality of scenes, each scene comprising both dual pixel images capturing the scene.

13. The system of claim 10, wherein the left dual-pixel view decoder and the right dual-pixel view decoder comprise an early-stage weight sharing at the end of the latent space encoder.

14. The system of claim 10, wherein the neural network module further performs deblurring of the input image and the output module outputs the deblurred image, wherein the trained artificial neural network further comprises a deblurring decoder, and wherein the deblurred image comprises the output of the deblurring decoder.

15. The system of claim 10, wherein the neural network module further predicts dual pixel views of the input image by determining the output of the left dual-pixel view decoder and the right dual-pixel view decoder.

16. The system of claim 15, wherein reflection removal, defocus deblurring, or both, are performed using the predicted dual pixel views.

17. The system of claim 10, further comprising a synthesis module to perform view synthesis using the input image, wherein determining the synthetic dual-pixel data comprises passing each of a plurality of rotated views of the input image as input to the trained artificial neural network, and wherein the view synthesis comprises a combination of the output of the left dual-pixel view decoder and the output of the right dual-pixel view decoder for each of the rotated view of the input image.

18. The system of claim 17, wherein the synthesis module further synthesizes image motion by rotating point spread functions through a plurality of different angles during the view synthesis.

* * * * *